United States Patent
Liu et al.

(10) Patent No.: US 10,932,206 B2
(45) Date of Patent: Feb. 23, 2021

(54) REFERENCE SIGNAL SENDING AND RECEIVING METHOD, NETWORK DEVICE, AND TERMINAL DEVICE

(71) Applicant: Huawei Technologies Co., Ltd., Shenzhen (CN)

(72) Inventors: Yong Liu, Shanghai (CN); Lu Rong, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/683,935

(22) Filed: Nov. 14, 2019

(65) Prior Publication Data

US 2020/0084732 A1    Mar. 12, 2020

Related U.S. Application Data

(63) Continuation of application No. PCT/CN2018/090547, filed on Jun. 11, 2018.

(30) Foreign Application Priority Data

Jun. 28, 2017 (CN) .......................... 201710510526.8

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0048* (2013.01); *H04L 25/0224* (2013.01);
(Continued)

(58) Field of Classification Search
CPC .............................................. H04W 52/00–60
See application file for complete search history.

(56) References Cited

U.S. PATENT DOCUMENTS

| | | |
|---|---|---|
| 2017/0118665 A1 | 4/2017 | Park et al. |
| 2017/0195974 A1 | 7/2017 | Huang |

(Continued)

FOREIGN PATENT DOCUMENTS

| | | |
|---|---|---|
| CN | 102088759 A | 6/2011 |
| CN | 105490787 A | 4/2016 |

(Continued)

OTHER PUBLICATIONS

3rd Generation Partnership Project;Technical Specification Group Radio Access Network; Evolved Universal Terrestrial Radio Access (E-UTRA); Physical layer procedures (Release 14), Jun. 23, 2017, 460 pages.

(Continued)

*Primary Examiner* — Raymond S Dean
(74) *Attorney, Agent, or Firm* — Slater Matsil, LLP

(57) ABSTRACT

This application provides a reference signal sending and receiving method, a network device, and a terminal device. The method includes: determining, by a network device, a transmit power used to transmit a reference signal, where the transmit power is related to a quantity of ports carried on an RE occupied by the reference signal; and sending, by the network device, the reference signal based on the transmit power.

15 Claims, 11 Drawing Sheets

(51) Int. Cl.
*H04L 25/02* (2006.01)
*H04W 52/14* (2009.01)
*H04W 52/34* (2009.01)
*H04W 52/36* (2009.01)
*H04W 72/04* (2009.01)

(52) U.S. Cl.
CPC ......... *H04W 52/14* (2013.01); *H04W 52/346* (2013.01); *H04W 52/367* (2013.01); *H04W 72/042* (2013.01); *H04W 72/0473* (2013.01)

(56) References Cited

U.S. PATENT DOCUMENTS

| | | |
|---|---|---|
| 2017/0264412 A1 | 9/2017 | Chen et al. |
| 2018/0183556 A1 | 6/2018 | Shin et al. |
| 2018/0262288 A1* | 9/2018 | Gao ........................ H04J 11/004 |
| 2018/0351719 A1* | 12/2018 | Lee ........................... H04L 1/00 |
| 2018/0359014 A1 | 12/2018 | Noh et al. |

FOREIGN PATENT DOCUMENTS

| | | |
|---|---|---|
| CN | 106255190 A | 12/2016 |
| WO | 2016204549 A1 | 12/2016 |
| WO | 2017078475 A1 | 5/2017 |

OTHER PUBLICATIONS

Ericsson, "On CDM8 patterns for 24 and 32 ports and port indexing for CDM4," 3GPP TSG-RAN WG1 #88, R1-1702367, Athens, Greece, Feb. 13-17, 2017, 12 pages.

\* cited by examiner

REFERENCE SIGNAL SENDING AND RECEIVING METHOD, NETWORK DEVICE, AND TERMINAL DEVICE

CROSS-REFERENCE TO RELATED APPLICATIONS

This application is a continuation of International Application No. PCT/CN2018/090547, filed on Jun. 11, 2018, which claims priority to Chinese Patent Application No. 201710510526.8, filed on Jun. 28, 2017. The disclosures of the aforementioned applications are hereby incorporated by reference in their entireties.

TECHNICAL FIELD

This application relates to the communications field, and more specifically, to a reference signal sending and receiving method, a network device, and a terminal device.

BACKGROUND

A multiple input multiple output (MIMO) technology is one of key technologies of the 5th generation mobile communication (5G). When data is transmitted by using the MIMO technology, a receive end device needs to perform channel estimation based on a received reference signal (for example, a demodulation reference signal (DMRS)).

A transmit power of the reference signal is one of factors that affect accuracy of channel estimation. A larger transmit power indicates higher accuracy of channel estimation. To fully use the transmit power and improve accuracy of channel estimation, in a current technology, a full power utilization rule is proposed. To be specific, on a same time-frequency resource (for example, a resource element (RE)), a transmit power of an idle port is lent to an active port for use. A relationship between the power borrowed by the active port from the idle port and an initial transmit power preconfigured by a network device for the active port may be represented by using a power boosting value (or referred to as a power compensation value, an offset value, or the like). In long term evolution (LTE), the power boosting value is usually 3 dB, namely, $10*\log_{10} 2$. In other words, a transmit power obtained after power boosting is twice an initial transmit power.

However, it is usually not flexible to transmit a reference signal by using a single power boosting value.

SUMMARY

This application provides a reference signal sending and receiving method, a network device, and a terminal device, to configure a transmit power for a reference signal more flexibly.

According to a first aspect, a reference signal sending method is provided. The method includes: determining, by a network device, a transmit power used to transmit a reference signal, where the transmit power is related to a quantity of ports carried on an RE occupied by the reference signal; and sending, by the network device, the reference signal based on the transmit power.

Therefore, in this embodiment of this application, the transmit power can be allocated to the reference signal based on the quantity of ports carried on the reference signal RE. Compared with a single power boosting value in the current technology, a transmit power can be more flexibly allocated to a reference signal on each port, so that power utilization is improved, and this helps improve accuracy of channel estimation, in other words, helps improve data transmission reliability. In addition, the network device can directly determine a transmit power based on a quantity of ports carried on each reference signal RE. A process of allocating an initial transmit power and a power boosting value is omitted. The reference signal sending method in this application is simpler and more convenient.

Optionally, the method further includes: sending, by the network device, first indication information, where the first indication information indicates a sum of powers allocated to the ports on the RE.

Optionally, the determining, by a network device, a transmit power used to transmit a reference signal includes: determining, by the network device based on a quantity of ports currently carried on the RE, the transmit power used to transmit the reference signal.

Therefore, the network device may determine the transmit power based on the quantity of ports currently carried on the reference signal RE, and the determined transmit power is more accurate.

Optionally, the method further includes: sending, by the network device, second indication information, where the second indication information indicates the quantity of ports currently carried on the RE.

Therefore, the terminal device may determine the transmit power based on the quantity of ports currently carried on the reference signal RE.

Optionally, the method further includes: sending, by the network device, indication information of the transmit power, where the indication information of the transmit power indicates a ratio of the transmit power to the sum of powers allocated to the ports on the RE.

Optionally, the determining, by a network device, a transmit power used to transmit a reference signal includes: determining, by the network device based on a maximum quantity of ports that can be carried on the RE, the transmit power used to transmit the reference signal.

Therefore, the network device may determine the transmit power based on the maximum quantity of ports that can be carried on the reference signal RE, in other words, may determine the transmit power of the reference signal based on a pilot pattern, thereby reducing signaling overheads used by the network device to indicate the transmit power to the terminal device.

Optionally, the determining, by a network device, a transmit power used to transmit a reference signal includes: determining, by the network device, the transmit power of the reference signal based on a ratio between the powers allocated to the ports on the RE occupied by the reference signal; and the method further includes: sending, by the network device, third indication information, where the third indication information indicates the ratio between the powers.

Therefore, the network device may determine a transmit power of each reference signal based on the ratio between the powers allocated to the ports, which is more flexible.

Optionally, the method further includes: sending, by the network device, indication information of the transmit power, where the indication information of the transmit power indicates a ratio of the transmit power to the sum of powers allocated to the ports on the RE.

Therefore, regardless of whether powers are evenly allocated to the ports, or how the network device determines the transmit power of the reference signal, the terminal device may determine the transmit power of the reference signal based on the indication information of the transmit power.

According to a second aspect, a reference signal receiving method is provided. The method includes: receiving, by a terminal device, a reference signal; determining, by the terminal device, a transmit power of the reference signal, where the transmit power is related to a quantity of ports carried on a resource element (RE) occupied by the reference signal; and performing, by the terminal device, channel estimation based on the reference signal and the transmit power.

Therefore, in this embodiment of this application, the transmit power can be allocated to the reference signal based on the quantity of ports carried on the reference signal RE. Compared with a single power boosting value in the prior art, a transmit power can be more flexibly allocated to a reference signal on each port, so that power utilization is improved, and this helps improve accuracy of channel estimation, in other words, helps improve data transmission reliability. In addition, the network device can directly determine a transmit power based on a quantity of ports carried on each reference signal RE. A process of allocating an initial transmit power and a power boosting value is omitted. The reference signal receiving method in this application is simpler and more convenient.

Optionally, the method further includes: receiving, by the terminal device, first indication information, where the first indication information indicates a sum of powers allocated to the ports on the RE.

Optionally, the determining, by the terminal device, a transmit power of the reference signal includes: receiving, by the terminal device, second indication information, where the second indication information indicates a quantity of ports currently carried on the RE; and determining, by the terminal device, the transmit power of the reference signal based on the quantity of ports currently carried on the RE.

Therefore, the transmit power of the reference signal is determined based on the quantity of ports currently carried on the reference signal RE, and the transmit power determined in this manner is more accurate.

Optionally, the determining, by the terminal device, a transmit power of the reference signal includes: determining, by the terminal device based on a maximum quantity of ports that can be carried on the RE, the transmit power used to transmit the reference signal.

Therefore, the terminal device may determine the transmit power based on the maximum quantity of ports that can be carried on the reference signal RE, in other words, may determine the transmit power of the reference signal based on a pilot pattern, thereby reducing signaling overheads used by the network device to indicate the transmit power to the terminal device.

Optionally, the method further includes: receiving, by the terminal device, third indication information, where the third indication information indicates a ratio between the powers allocated to the ports on the RE occupied by the reference signal; and the determining, by the terminal device, a transmit power of the reference signal includes: determining, by the network device, the transmit power of the reference signal based on the ratio between the powers.

Therefore, the network device may determine a transmit power of each reference signal based on the ratio between the powers allocated to the ports, which is more flexible.

Optionally, the method further includes: receiving, by the terminal device, indication information of the transmit power, where the indication information of the transmit power indicates a ratio of the transmit power to the sum of powers allocated to the ports on the RE.

Therefore, regardless of whether powers are evenly allocated to the ports, or how the network device determines the transmit power of the reference signal, the terminal device may determine the transmit power of the reference signal based on the indication information of the transmit power.

According to a third aspect, a reference signal sending method is provided. The method includes: determining, by a network device, a first power boosting value in at least three pre-stored power boosting power boosting values, where the first power boosting value is used to indicate an offset value relative to an initial transmit power of a reference signal; and determining, by the network device, a transmit power of the reference signal based on the first power boosting value, and sending the reference signal based on the transmit power.

In this embodiment of this application, more power boosting values are preconfigured, so that there are more optional power boosting values than that in the current technology. This helps determine a more appropriate power boosting value for a different quantity of ports based on a quantity of currently scheduled ports. Therefore, the power boosting value is more flexible than a single power boosting value in the current technology. In addition, sending the reference signal based on the power boosting value and the initial transmit power can utilize the power to a greater extent, thereby improving power utilization. In addition, accuracy of channel estimation is improved by increasing the transmit power, thereby improving data transmission reliability.

In this embodiment of this application, the network device may determine the first power boosting value by using the following two methods.

Method 1: The network device determines the first power boosting value based on a pilot pattern.

Method 2: The network device determines the first power boosting value based on the quantity of currently scheduled ports.

Specifically, in Method 1, the determining, by a network device, a first power boosting value in at least three pre-stored power boosting values includes: determining, by the network device, the first power boosting value based on a currently used first pilot pattern and correspondences between the at least three pre-stored power boosting power boosting values and a plurality pilot patterns.

In Method 1, the first power boosting value may be determined based on a binding relationship between the pilot pattern and the power boosting value, and no additional signaling is needed to indicate the first power boosting value. A terminal device may determine the corresponding first power boosting value by using indication information, of the pilot pattern, that is sent by the network device to the terminal device. Therefore, the power is utilized to a greater extent, and signaling overheads are reduced.

In Method 2, the network device determines an ideal power boosting value based on the quantity of currently scheduled ports; and the network device determines the first power boosting value based on the ideal power boosting value and the at least three pre-stored power boosting values.

In a possible case, the reference signal is a reference signal on a first port, the network device is provided with at least one third port, and a same RE is multiplexed for a reference signal on the at least one third port and the reference signal on the first port in a code division manner. This case may be usually applied to a scenario in which a quantity of ports is relatively large. For example, the quantity of ports is 8, 12, or even larger.

In this case, that the network device determines an ideal power boosting value based on the quantity of currently scheduled ports specifically includes: determining, by the network device, the ideal power boosting value based on the quantity of currently scheduled ports and a length of an orthogonal cover code.

Specifically, the ideal power compensation value may be calculated by using the following formula:

$$a\ power\ boosting\ value = 10\ \log_{10}(a\ quantity\ of\ ports/a\ length\ of\ an\ orthogonal\ cover\ code).$$

In another possible case, the reference signal is a reference signal on a first port, and a same time domain resource is multiplexed for the reference signal on the first port and a reference signal on each of at least one fourth port in a frequency division manner. This case may be usually applied to a scenario in which a quantity of ports is relatively small. For example, the quantity of ports is 2, 4, or even 6.

In this case, frequency division multiplexing instead of code division multiplexing is applied to the ports. The ideal power compensation value may be directly determined based on the quantity of currently scheduled ports.

Specifically, the ideal power compensation value may be calculated by using the following formula:

$$a\ power\ boosting\ value = 10 * \log_{10}(a\ quantity\ of\ ports).$$

In Method 2, the first power boosting value may be determined based on the quantity of currently scheduled ports. Therefore, the determined first power boosting value is more accurate.

Optionally, the method further includes: sending, by the network device, indication information of the first power boosting value.

If the network device determines the first power boosting value by using Method 2, the network device may indicate the first power boosting value to the terminal device by using signaling.

In a possible implementation, the network device and the terminal device may pre-store correspondences between a plurality of optional power boosting values and indexes. After determining the first power boosting value, the network device may add an index of the first power boosting value to the indication information, of the first power boosting value, that is sent to the terminal device, so that the terminal device determines the first power boosting value.

Optionally, the indication information of the first power boosting value includes the index of the first power compensation value. However, in some cases, powers configured by the network device for the ports may be uneven. In this case, the first power boosting value may be calculated by using Method 2, and may be notified to the terminal device by using the indication information of the first power boosting value.

In a possible case, the first power compensation value obtained through calculation by using Method 2 still belongs to the plurality of pre-stored optional power boosting values. For example, the first power compensation value obtained through calculation is the same as or close to one of the plurality of pre-stored optional power boosting values. In this case, the network device may send, to the terminal device by using the indication information of the first power boosting value, an index of the power compensation value that is the same as or close to the first power compensation value.

In another possible case, the first power compensation value obtained through calculation by using Method 2 does not belong to the plurality of pre-stored optional power boosting values. For example, the first power compensation value obtained through calculation is different from or not close to any one of the plurality of pre-stored optional power boosting values. In this case, the network device may directly add the first power boosting value to the indication information of the first power boosting value. Optionally, the indication information of the first power boosting value includes the first power boosting value or a quantized value of the first power boosting value. Alternatively, the network device may add a power allocation ratio to the indication information of the first power boosting value, so that the terminal device obtains the first power boosting value through calculation based on the power allocation ratio. Optionally, the indication information of the first power boosting value includes the power allocation ratio or a quantized value of the power allocation ratio.

Optionally, the method further includes: sending, by the network device, indication information of a second power boosting value, where the second power boosting value is determined based on a transmit power of the data RE, and the data RE occupies a same time domain resource as the reference signal; and the determining, by the network device, a transmit power of the reference signal based on the first power boosting value includes: determining, by the network device, the transmit power of the reference signal based on the first power boosting value and the second power boosting value, where the second power boosting value is from a transmit power of the data RE, the data RE is used to carry data, and the data RE and an RE occupied by the reference signal occupy a same time domain resource.

A part of the transmit power of the data RE is lent to the reference signal, so that the transmit power of the reference signal may be further improved, thereby improving accuracy of channel estimation.

According to a fourth aspect, a reference signal receiving method is provided. The method includes: receiving, by a terminal device, a reference signal; determining, by the terminal device, a first power boosting value based on a currently used first pilot pattern, and correspondences between at least three pre-stored power boosting power boosting values and a plurality of pilot patterns, where the first power boosting value is used to indicate an offset value relative to an initial transmit power of the reference signal; and determining, by the terminal device, a transmit power of the reference signal based on the first power boosting value, and performing channel estimation based on the reference signal and the transmit power.

In this embodiment of this application, the first power boosting value is determined based on a quantity of currently scheduled ports and the correspondences between the pilot patterns and the power boosting values, thereby improving power utilization. In addition, accuracy of channel estimation is improved by increasing the transmit power, thereby improving data transmission reliability. Further, no additional signaling indication is needed, thereby reducing signaling overheads.

Optionally, the method further includes: receiving, by the terminal device, indication information of a second power boosting value, where the second power boosting value is from a transmit power of a data RE, the data RE is used to carry data, and the data RE and the first RE occupy a same time domain resource; and the determining, by the terminal device, a transmit power of the reference signal based on the first power boosting value includes: determining, by the terminal device, the transmit power of the reference signal based on the first power boosting value and the second power boosting value.

A part of the transmit power of the data RE is lent to the reference signal, so that the transmit power of the reference signal may be further improved, thereby improving accuracy of channel estimation.

According to a fifth aspect, a reference signal receiving method is provided. The method includes: receiving, by a terminal device, a reference signal; receiving, by the terminal device, indication information of a first power boosting value, where the indication information of the first power boosting value is used to determine the first power boosting value, and the first power boosting value is used to indicate an offset value relative to an initial transmit power of the reference signal; and determining, by the terminal device, a transmit power of the reference signal based on the first power boosting value, and performing channel estimation based on the reference signal and the transmit power.

In this embodiment of this application, the first power boosting value is determined based on a quantity of currently scheduled ports and a length of an orthogonal cover code, so that the first power boosting value can be determined more accurately and a power can be utilized to a greater extent, thereby improving power utilization. In addition, accuracy of channel estimation is improved by increasing the transmit power, thereby improving data transmission reliability.

In a possible implementation, a network device and the terminal device may pre-store correspondences between a plurality of optional power boosting values and indexes, the indication information, of the first power boosting value, that is received by the terminal device carry an index of the first power boosting value, and the terminal device may determine the first power boosting value based on the pre-stored correspondences between the plurality of power boosting values and the indexes.

Optionally, the indication information of the first power boosting value includes the index of the first power boosting value.

However, in some cases, powers configured by the network device for the ports may be uneven. In this case, the indication information of the first power boosting value may be used to determine the first power boosting value.

In a possible case, the first power compensation value belongs to a plurality of pre-stored optional power boosting values. For example, the first power compensation value is the same as or close to one of the plurality of pre-stored optional power boosting values. In this case, the network device may still send, to the terminal device by using the indication information of the first power boosting value, an index of the power compensation value that is the same as or close to the first power compensation value, and the terminal device may determine the first power boosting value based on correspondences between the plurality of pre-stored power boosting values and indexes.

In another possible case, the first power compensation value does not belong to the plurality of pre-stored optional power boosting values. For example, the first power compensation value is different from or not close to any one of the plurality of pre-stored optional power boosting values. In this case, the network device may directly add the first power boosting value to the indication information of the first power boosting value. Optionally, the indication information of the first power boosting value includes the first power boosting value or a quantized value of the first power boosting value. Alternatively, the network device may add a power allocation ratio to the indication information of the first power boosting value, and the terminal device may obtain the first power boosting value through calculation based on the power allocation ratio. Optionally, the indication information of the first power boosting value includes the power allocation ratio or a quantized value of the power allocation ratio.

Optionally, the method further includes: receiving, by the terminal device, indication information of a second power boosting value, where the second power boosting value is determined based on a transmit power of a data RE, and the data RE occupies a same time domain resource as the reference signal; and the determining, by the terminal device, a transmit power of the reference signal based on the first power boosting value includes: determining, by the terminal device, the transmit power of the reference signal based on the first power boosting value and the second power boosting value.

A part of the transmit power of the data RE is lent to the reference signal, so that the transmit power of the reference signal may be further improved, thereby improving accuracy of channel estimation.

According to a sixth aspect, a network device is provided. The network device includes modules configured to perform the reference signal sending method according to any one of the first aspect or the possible implementations of the first aspect, or includes modules configured to perform the reference signal sending method according to any one the third aspect or the possible implementations of the third aspect.

According to a seventh aspect, a terminal device is provided. The terminal device includes modules configured to perform the reference signal receiving method according to any one of the second aspect or the possible implementations of the second aspect, or includes modules configured to perform the reference signal receiving method according to any one of the fourth aspect or the possible implementations of the fourth aspect, or includes modules configured to perform the reference signal receiving method according to any one of the fifth aspect or the possible implementations of the fifth aspect.

According to an eighth aspect, a network device is provided. The network device includes a transceiver, a processor, and a memory. The processor is configured to control the transceiver to receive/send a signal, the memory is configured to store a computer program, and the processor is configured to invoke the computer program from the memory and run the computer program, so that the terminal device performs the method according to any one of the first aspect or the possible implementations of the first aspect, or the method according to any one of the third aspect or the possible implementations of the third aspect.

According to a ninth aspect, a terminal device is provided. The terminal device includes a transceiver, a processor, and a memory. The processor is configured to control the transceiver to receive/send a signal, the memory is configured to store a computer program, and the processor is configured to invoke the computer program from the memory and run the computer program, so that the network device performs the method according to any one of the second aspect or the possible implementations of the second aspect, or the method according to any one of the fourth aspect or the possible implementations of the fourth aspect, or the method according to any one of the fifth aspect or the possible implementations of the fifth aspect.

In a possible design, the network device may be implemented by using a chip.

In a possible design, the terminal device may be implemented by using a chip.

According to a tenth aspect, a communications apparatus is provided. The communications apparatus may be the network device in the foregoing method designs, or may be a chip disposed in the network device. The communications apparatus includes a processor that is coupled to a memory and may be configured to execute an instruction in the memory, to implement the method performed by the network device according to any one of the first aspect or the possible implementations of the first aspect, or the method according to any one of the third aspect or the possible implementations of the third aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to an eleventh aspect, a communications apparatus is provided. The communications apparatus may be the terminal device in the foregoing method designs, or may be a chip disposed in the terminal device. The communications apparatus includes a processor that is coupled to a memory and may be configured to execute an instruction in the memory, to implement the method performed by the terminal device according to any one of the second aspect or the possible implementations of the second aspect, or the method according to any one of the fourth aspect or the possible implementations of the fourth aspect, or the method according to any one of the fifth aspect or the possible implementations of the fifth aspect. Optionally, the communications apparatus further includes the memory. Optionally, the communications apparatus further includes a communications interface, and the processor is coupled to the communications interface.

When the communications apparatus is the terminal device, the communications interface may be a transceiver, or an input/output interface.

When the communications apparatus is the chip disposed in the terminal device, the communications interface may be an input/output interface.

Optionally, the transceiver may be a transceiver circuit. Optionally, the input/output interface may be an input/output circuit.

It should be understood that a function of the processor may be implemented by using hardware or software. When the function of the processor is implemented by using hardware, the processor may be a logic circuit, an integrated circuit, or the like. When the function of the processor is implemented by using software, the processor may be a general purpose processor implemented by reading software code stored in the memory, and the memory may be integrated into the processor or may independently exist outside the memory.

According to a twelfth aspect, a computer program product is provided. The computer program product includes a computer program (also referred to as code or an instruction), and when the computer program is run, a computer performs the method according to any one of the first aspect to the fifth aspect and the possible implementations of the first aspect to the fifth aspect.

According to a thirteenth aspect, a computer readable medium is provided. The computer readable medium stores a computer program (also referred to as code or an instruction), and when the computer program is run on a computer, the computer performs the methods according to any one of the first aspect to the fifth aspect and the possible implementations of the first aspect to the fifth aspect.

In some possible implementations, the first indication information may be carried in a radio resource control (RRC) message.

In some possible implementations, the second indication information may be carried in downlink control information (DCI).

In some possible implementations, the third indication information may be carried in DCI.

In some possible implementations, the indication information of the first power boosting value may be carried in any one of the following: an RRC message, a media access control control element (CE), or DCI.

In some possible implementations, the indication information of the second power boosting value may be carried in any one of the following: an RRC message, a MAC CE, or DCI.

Based on the foregoing designs, in embodiments of this application, the transmit power can be configured for the reference signal more flexibly, and power utilization can be improved. In addition, accuracy of channel estimation is improved by increasing the transmit power, thereby improving data transmission reliability.

DETAILED DESCRIPTION OF ILLUSTRATIVE EMBODIMENTS

The following describes technical solutions of this application with reference to the accompanying drawings.

It should be understood that the technical solutions of this application may be applied to various communications systems, for example, a global system for mobile communications (GSM), a code division multiple access (CDMA) system, a wideband code division multiple access (WCDMA) system, and a general packet radio service (GPRS), a long term evolution (LTE) system, a long term evolution advanced (LTE-A) system, a universal mobile telecommunication system (UMTS), a next-generation communications system (for example, a 5th generation communications (5G) system), a converged system of a plurality of access systems, or an evolved system. The 5G system may also be referred to as a new radio access technology (NR) system.

Figure 1:
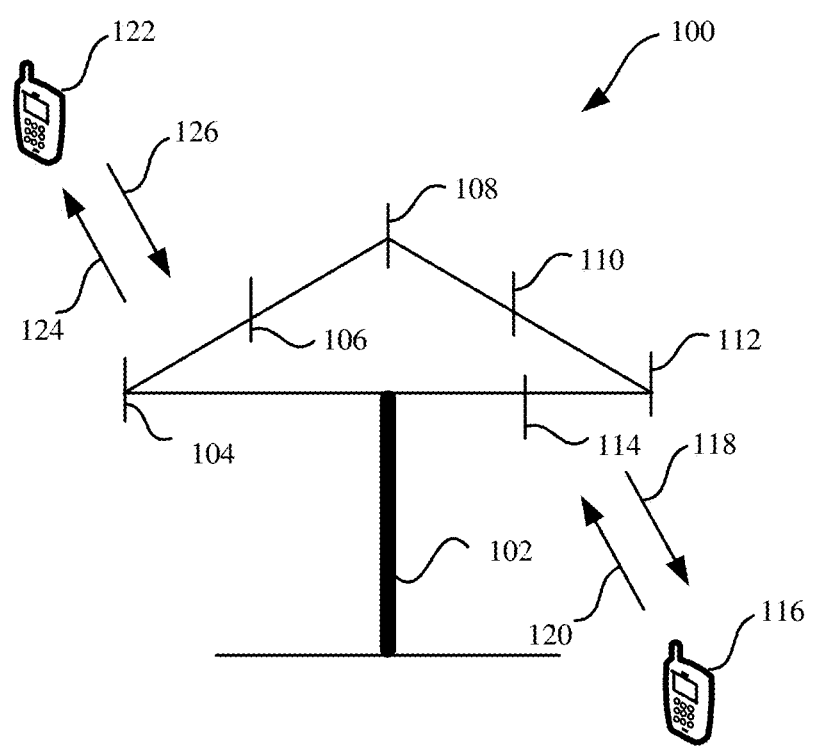
FIG. 1 is a schematic diagram of a communications system to which a reference signal sending and receiving method is applied according to an embodiment of this application.

For ease of understanding the embodiments of this application, a communications system applicable to the embodiments of this application is described in detail with reference to FIG. 1. FIG. 1 is a schematic diagram of a communications system to which a data transmission method and an apparatus are applied according to an embodiment of this application. As shown in FIG. 1, the communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, and an antenna) related to signal sending and receiving.

It should be understood that the network device may be any device having a wireless transceiver function or a chip that can be disposed in the device, and the device includes but is not limited to: a base station (for example, a NodeB or an evolved NodeB (eNodeB)), a network device in a 5G communications system (for example, a transmission point (TP), a transmission reception point (TRP), a base station, and a small cell device), a network device in a future communications system, and an access node, a wireless relay node, a wireless backhaul node, and the like in a wireless fidelity (Wi-Fi) system.

The network device 102 may communicate with a plurality of terminal devices (for example, a terminal device 116 and a terminal device 122). The network device 102 may communicate with any quantity of terminal devices similar to the terminal device 116 or 122.

It should be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote surgery (remote medical), a wireless terminal in a smart grid, a wireless terminal in transportation safety, a wireless terminal in a smart city, a wireless terminal in a smart home, or the like. An application scenario is not limited in this embodiment of this application. In this application, the terminal device and a chip that can be disposed in the terminal device are collectively referred to as a terminal device.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. Further, the terminal device 122 communicates with the antennas 104 and 106. The antennas 104 and 106 send information to the terminal device 122 by using a forward link 124, and receive information from the terminal device 122 by using a reverse link 126.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. Further, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in a sector in coverage of the network device 102. In a process in which the network device 102 separately communicates with the terminal devices 116 and 122 by using the forward links 118 and 124, a transmit antenna of the network device 102 may improve signal-to-noise ratios of the forward links 118 and 124 through beamforming. In addition, when the network device 102 sends, through beamforming, signals to the terminal devices 116 and 122 that are randomly distributed within the related coverage, a mobile device in an adjacent cell is less interfered than that in a case in which a network device sends signals to all terminal devices of the network device by using a single antenna.

The network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of the data, and the transport block may be segmented to generate a plurality of code blocks.

In addition, the communications system wo may be a public land mobile network (PLMN) network, a device to device (D2D) network, a machine to machine (M2M) network, or another network. FIG. 1 is only a simplified schematic diagram shown for ease of understanding, and the network may further include another network device not shown in FIG. 1.

For ease of understanding of the embodiments of this application, the following briefly describes, by using downlink data transmission as an example, a process of performing data transmission by using a MIMO technology. A terminal device performs channel estimation and channel state information (CSI) measurement based on a reference signal (for example, a channel state information-reference signal (CSI-RS)) sent by a network device. Specifically, the terminal device may determine a channel matrix based on the received reference signal, and further feed back CSI based on the channel matrix. For example, the CSI includes a precoding matrix indicator (PMI), a rank indicator (RI), and a channel quality indicator (CQI). Then, the network device may determine a precoding matrix based on the CSI fed back by the terminal device. It should be understood that the precoding matrix determined by the network device may be the same as or different from a precoding matrix determined by the terminal device. This is not limited in this application. Then, the network device precodes to-be-sent data and a demodulation reference signal (for example, a DMRS), and sends the precoded data and demodulation reference signal to the terminal device. The terminal device may perform channel estimation based on the received DMRS, to determine an equivalent channel matrix, and further obtain, through demodulation, the data sent by the network device.

It can be learned from the foregoing process that accuracy of channel estimation affects data reception performance. Therefore, using a relatively large transmit power to send a reference signal is a method for improving accuracy of channel estimation, thereby improving data transmission reliability.

Figure 2:
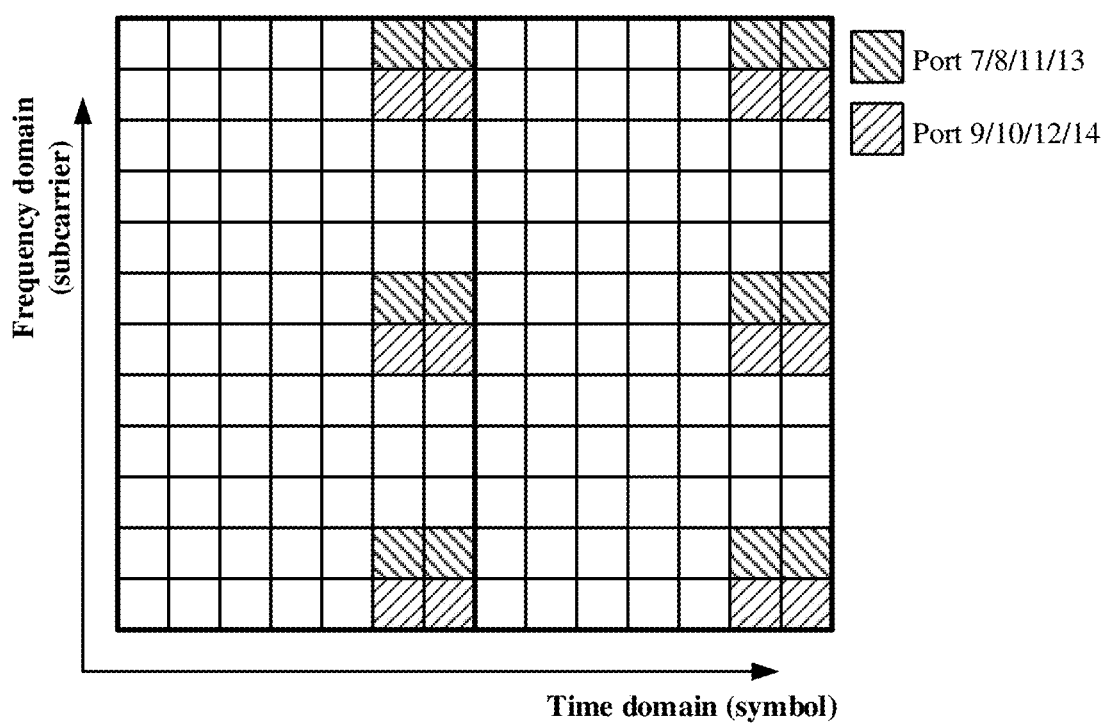
FIG. 2 shows a pilot pattern for eight ports.

A DMRS is used as an example. In an existing technology, a maximum quantity of orthogonal data streams that can be supported by a downlink DMRS is 8. In other words, a maximum quantity of DMRS ports is 8, and a corresponding pilot pattern may be shown in FIG. 2. FIG. 2 shows a pilot pattern for eight ports. As shown in the figure, different ports are distinguished by using a frequency division multiplexing (FDM) manner and a code division multiplexing (CDM) manner. Specifically, DMRSs corresponding to the eight ports may be grouped into two groups. A same time domain resource is multiplexed for a DMRS group (corresponding to a port 7/8/11/13 in the figure) corresponding to a port #7, a port #8, a port #11, and a port #13 and a DMRS group (corresponding to a port 9/10/12/14 in the figure) corresponding to a port #9, a port #10, a port #12, and a port #14 in a frequency division multiplexing manner. A same time-frequency resource is multiplexed for the port #7, the port #8, the port #11, and the port #13 in the group in a code division multiplexing manner and a same time-frequency resource is multiplexed for the port #9, the port #10, the port #12, and the port #14 in the group in a code division multiplexing manner. For example, code division multiplexing is implemented by using an orthogonal cover code (OCC) or through a cyclic shift. Therefore, the port #7, the port #8, the port #11, and the port #13 may be denoted as a CDM group (denoted as a CDM group #1 for ease of distinguishing and description). The port #9, the port #10, the port #12, and the port #14 are denoted as a CDM group (denoted as a CDM group #2 for ease of distinguishing and description).

It may be understood that the DMRS and data are both carried on a physical resource and transmitted through a physical channel. In a data transmission process, to avoid interference of the data on the DMRS, the time-frequency resource (for example, resource elements (RE)) occupied by the DMRSs of the port #9, the port #10, the port #12, and the port #14 are reserved on the time-frequency resource (for example, resource blocks (RB)) of the port #7, the port #8, the port #11, and the port #13 and are not used to carry data or another signal. Similarly, the time-frequency resource of the port #7, the port #8, the port #11, and the port #13 are reserved on the time-frequency resource of the port #9, the port #10, the port #12, and the port #14 and are not used to carry data or another signal. In other words, no data or a signal other than the DMRS is carried on time-frequency resources of the eight ports, namely, shadow parts in the figure.

Therefore, when the network device currently schedules any one or more ports in the CDM group #1, transmit powers of the four idle ports in the CDM group #2 may be lent to the ports in the CDM group #1. According to the LTE protocol, a power boosting value borrowed by a CDM group from another CDM group is 3 dB, namely, $10*\log_{10}2$. Herein, 2 indicates that a power for finally sending a DMRS is twice an initial transmit power after the power is borrowed from the another CDM group. In other words, a power for sending a DMRS on an active port in the CDM group #1 may be a sum of the initial transmit power (dB)+3 (dB).

It should be noted that, 3 dB defined above is obtained by assuming that powers on time-frequency resources of the ports are evenly allocated and assuming that a quantity of active ports in the CDM group #1 is largest, in other words, the transmit powers of the four idle ports are respectively lent to the four active ports. Therefore, a power for finally transmitting a signal on each port is twice the initial transmit power.

However, with development of a 5G multi-antenna technology, a quantity of transmission layers of a data stream increases, a quantity of ports also increases, and resources occupied by corresponding reference signals increase correspondingly. To avoid wasting idle pilot resources, in a new radio access technology (NR), a solution in which a plurality of pilot patterns are configured for the reference signals is proposed. In this case, a quantity of CDM groups that occupy a same time-frequency resource may be greater than 2. When a port in one of the CDM groups sends a DMRS, the port may borrow a transmit power from ports in a plurality of other CDM groups. In this case, if a transmit power is still determined based on the power boosting value of 3 dB defined in the LTE protocol, power usage is inflexible. For example, transmit powers of many idle ports may be not fully utilized. Consequently, more power waste is caused.

In view of this, this application provides a reference signal sending and receiving method, to configure a transmit power for a reference signal more flexibly, and improve power utilization.

The following describes the embodiments of this application in detail with reference to the accompanying drawings.

It should be noted that the reference signal in the embodiments of this application may be used to perform channel estimation. For example, the reference signal in the embodiments of this application may be a CSI-RS used to estimate a channel matrix, so as to feed back CSI and determine a precoding matrix. Alternatively, the reference signal may be a DMRS used to estimate an equivalent channel matrix, so as to perform data demodulation. It should be understood that the CSI-RS and the DMRS are only examples for ease of understanding, and should not constitute any limitation on this application. The reference signal is not specifically limited in this application. The reference signal in this application may be any reference signal that can be used for channel estimation, for example, a cell-specific reference signal (CRS), or another reference signal that can be used to implement a same or similar function.

It should be further noted that, in the embodiments of this application, a reference signal (denoted as a first reference signal for ease of distinguishing and description, namely, an example of a reference signal) of only one port (denoted as a first port for ease of distinguishing and description) is used as an example to describe the reference signal sending and receiving method. However, this should not constitute any limitation on the embodiments of this application. It should be understood that the first port may be any one of a plurality of ports scheduled by a network device, the first reference signal is a reference signal corresponding to the first port, and may be any one of a plurality of reference signals sent by the network device. A specific process in which the network device performs sending processing on reference signals on a plurality of ports is the same as a specific process in which a terminal device performs receiving processing on a plurality of ports.

It should be further noted that a reference signal is defined by a port, and each reference signal corresponds to one port library. For example, one DMRS corresponds to one DMRS port, and one CSI-RS corresponds to one CSI-RS port.

In the embodiments of this application, for ease of distinguishing and description, an RE used to carry a reference signal is denoted as a reference signal RE. It may be understood that each port on the reference signal RE does not necessarily carry a reference signal, but the reference signal RE is only used to carry the reference signal, and not used to carry a data signal or another signal. For a reference signal on a determined port, an RE occupied by the reference signal may be determined based on a pilot pattern. Correspondingly, an RE used to carry data is denoted as a data RE. It may be understood that frequency division multiplexing (FDM) or time division multiplexing (TDM) may be applied to the data RE and the reference signal RE.

Without loss of generality, the following describes in detail the reference signal sending and receiving method in the embodiments of this application by using an example in which the network device sends the first reference signal to the terminal device. It should be understood that the network device may correspond to the network device 102 in FIG. 1. The terminal device may be any one of a plurality of terminal devices in communication connection to the network device, and may correspond to the terminal device 116 or 122 in FIG. 1.

Figure 3:
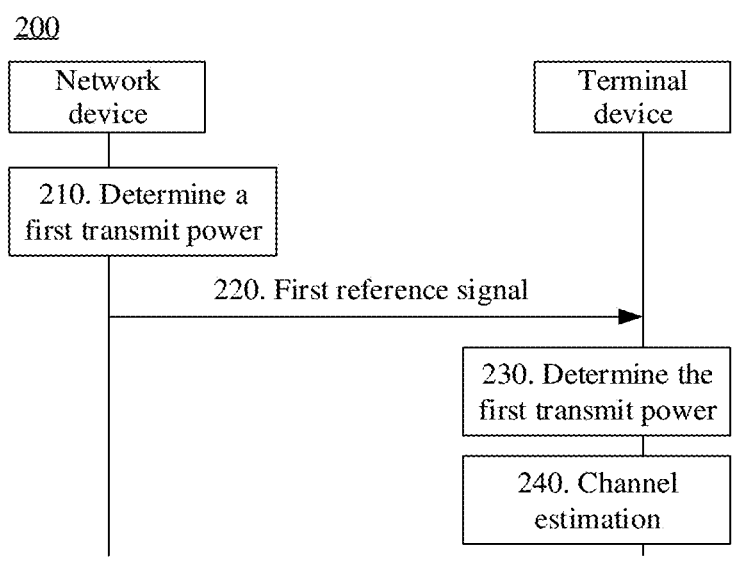
FIG. 3 is a schematic flowchart of a reference signal sending and receiving method according to an embodiment of this application.

FIG. 3 is a schematic flowchart of a reference signal sending and receiving method 200 according to an embodiment of this application. FIG. 3 shows this embodiment of this application from a perspective of device interaction.

As shown in FIG. 3, the method 200 includes step 210 to step 260.

In step 210, a network device determines a transmit power (denoted as a first transmit power for ease of distinguishing and description) used to transmit a first reference signal, where the transmit power is related to a quantity of ports carried on an RE (denoted as a first RE for distinguishing and description) occupied by the first reference signal.

In step 220, the network device sends the first reference signal based on the transmit power.

Correspondingly, in step 220, a terminal device receives the first reference signal.

In step 230, the terminal device determines the transmit power of the first reference signal.

In step 240, the terminal device performs channel estimation based on the first reference signal and the transmit power of the first reference signal.

Specifically, a sum of powers configured by the network device for ports on each reference signal RE may be determined based on a transmit power of a downlink reference signal, and the transmit power of the downlink reference signal may be preconfigured by a higher layer and indicated to a physical layer by using higher layer signaling (for example, an RRC message). Therefore, the network device may determine, based on the transmit power of the downlink reference signal that is configured by the higher layer, the sum of powers allocated to the ports on each reference signal RE.

In this embodiment of this application, for ease of description, a sum of powers configured by the network device for the ports on the first RE is denoted as a total power of the first RE. It may be understood that, for different ports, corresponding reference signals may occupy different REs. Therefore, a time-frequency resource corresponding to the first RE corresponds to a reference signal on one port.

Optionally, the method 200 further includes the following operation.

The network device sends first indication information, where the first indication information indicates the sum of powers allocated to the ports on the first RE.

Correspondingly, after receiving the first indication information, the terminal device may determine the sum of powers allocated to the ports on the first RE.

It should be understood that the network device may notify the terminal device of the total power of the first RE by using the indication information, but this is only a possible implementation and should not constitute any limitation on this application. In another possible implementation, the sum of powers configured by the network device for the ports on each reference signal RE may alternatively be predefined. For example, the sum of powers allocated to the ports on the reference signal RE is fixed in a protocol.

The following separately describes in detail, from a perspective of a network device and a perspective of a terminal device, specific implementation processes of determining the first transmit power by using different methods.

In step 210, the network device may specifically determine the first transmit power by using either of the following methods.

Method 1: The network device determines the first transmit power based on a maximum quantity of ports that can be carried on the first RE.

Method 2: The network device determines the first transmit power based on a quantity of ports currently carried on the first RE.

In Method 1, the network device may directly determine, based on a currently used pilot pattern (denoted as a first pilot pattern for ease of distinguishing and description), the maximum quantity (for example, denoted as N, where N is a natural number) of ports that can be carried on the first RE. Assuming that the network device evenly allocates the total power of the first RE to the ports, it may be obtained that a power allocated to each port is 1/N of the total power. Therefore, the network device may determine a transmit power allocated to a reference signal on each port. To be specific, the network device determines the transmit power used to send the first reference signal, namely, the first transmit power.

After determining the transmit power allocated to the reference signal on each port, the network device may send the reference signal on each port by using a time-frequency resource. In a possible implementation, in a precoding process, the network device may allocate a power to each port by multiplying a reference signal by a column vector (it may be understood that each row in the column vector corresponds to one port), and a proportion relationship between rows in the column vector indicates a ratio between powers allocated to the ports. After RE mapping is performed on a precoded signal (including a reference signal and data), the signal has a transmit power on an RE corresponding to each port, and the corresponding reference signal is sent based on the transmit power. For example, the network device sends the first reference signal based on the first transmit power.

It should be understood that the foregoing method for sending a reference signal based on a transmit power is only a possible implementation, and should not constitute any limitation on this application. It should be further understood that a specific method for sending the reference signal by the network device based on the transmit power may be the same as that in the prior art. For brevity, details are not described herein again.

After receiving the first reference signal, the terminal device may alternatively determine, based on the currently used first pilot pattern, the maximum quantity of ports that can be carried on the first RE, and determine the first transmit power based on the maximum quantity of ports.

In conclusion, in Method 1, the maximum quantity of ports that can be carried on the first RE may be directly determined based on the pilot pattern. Therefore, the network device and the terminal device may separately determine the first transmit power.

In Method 2, the network device may determine the first transmit power based on the quantity of ports currently carried on the first RE. The determined first transmit power is more accurate than that in Method 1, and a power can be utilized to a greater extent, to improve accuracy of channel estimation.

Specifically, in Method 2, in a specific method for determining the first transmit power by the network device, whether the powers of the ports are evenly allocated may be considered. A ratio of the first transmit power determined by the network device to the total power of the first RE in a case in which the powers of the ports are evenly allocated differs from that in a case in which the powers of the ports are unevenly allocated. Detailed descriptions are provided in the following with reference to the case of even allocation and the case of uneven allocation.

If the powers of the ports are evenly allocated, the network device may directly determine the first transmit power based on the quantity (for example, denoted as n, where it may be understood that n≤N, and n is a natural number) of ports currently carried on the first RE.

Optionally, the method further includes the following operation.

The network device sends second indication information, where the second indication information is used to indicate the quantity of ports currently carried on the first RE.

In a possible design, the second indication information is carried in DCI.

Optionally, the method further includes the following operation.

The network device sends indication information of the first transmit power, where the indication information of the first transmit power indicates the ratio of the first transmit power to the total power of the first RE.

In a possible design, the indication information of the first transmit power is carried in DCI.

It may be understood that the network device may send only either of the second indication information or the indication information of the first transmit power, and the terminal device may determine the first transmit power based on received indication information.

If the powers of the ports are unevenly allocated, the network device may determine, based on the quantity of ports currently carried on the first RE, a power evenly allocated to each port, and then determine a power allocated to each port based on the power ratio between the ports, so that the first transmit power is determined.

Optionally, the method further includes the following operation:

The network device sends third indication information, where the third indication information is used to indicate a ratio between powers allocated to the ports on the first RE.

In a possible design, the third indication information is carried in any one of the following: an RRC message, a MAC CE, or DCI.

Optionally, the method further includes the following operation.

The network device sends indication information of the first transmit power, where the indication information of the first transmit power indicates the ratio of the first transmit power to the total power of the first RE.

In a possible design, the indication information of the first transmit power is carried in DCI.

It may be understood that the network device may send only either of the second indication information or the indication information of the first transmit power, and the terminal device may determine the first transmit power based on received indication information.

It should be understood that after determining the transmit power allocated to each port, the network device may send the reference signal on each port based on the power ratio by using a time-frequency resource. The specific process in which the network device sends the reference signal based on the transmit power is described in Method 1. For brevity, details are not described herein again.

In conclusion, in Method 2, the network device may determine the first transmit power based on the quantity of currently used ports, and the determined first transmit power is more accurate than that in Method 1. In addition, the network device may determine the first transmit power based on the ratio between powers allocated to the ports, which is more flexible than Method 1.

Therefore, in this embodiment of this application, a transmit power is allocated to each port based on a quantity of ports carried on each reference signal RE. Compared with a single power boosting value in the current technology, a transmit power can be more flexibly allocated for a reference signal on each port, so that power utilization is improved. In this way, accuracy of channel estimation is improved, in other words, data transmission reliability is improved. In addition, the network device can directly determine the transmit power based on the quantity of ports carried on each reference signal RE. A process of allocating an initial transmit power and a power boosting value in the prior art is omitted. The reference signal sending and receiving method in this embodiment is simpler and more convenient.

However, it should be understood that the method for determining the first transmit power by the network device is not limited to the method described above. The network device may alternatively use a power compensation method in the prior art to determine a power boosting value for the first reference signal (denoted as a first power boosting value for ease of distinguishing and description). A reference signal sending and receiving method in another embodiment of this application is described below in detail with reference to the accompanying drawings.

It should be noted that, in this embodiment of this application, a case in which a transmit power of an idle port is lent to an active port is described based on a time-frequency resource, and specifically, described based on an RE. An idle port may be understood as that an RE on the port does not carry a signal, and an active port may be understood as that the RE on a same time-frequency point on the active port carries a signal (for example, including a reference signal, a data signal, and the like). That a transmit power of the idle port is lent to the active port may be understood as: A transmit power preconfigured for an RE (for example, denoted as an RE #0) that is on a port and that does not carry a signal is compensated (or appropriated) for the RE (for example, RE #0) that is on another port and that carries a reference signal. In this way, a transmit power of the reference signal on the RE is improved. For brevity, descriptions of same or similar cases are omitted below.

Figure 5:
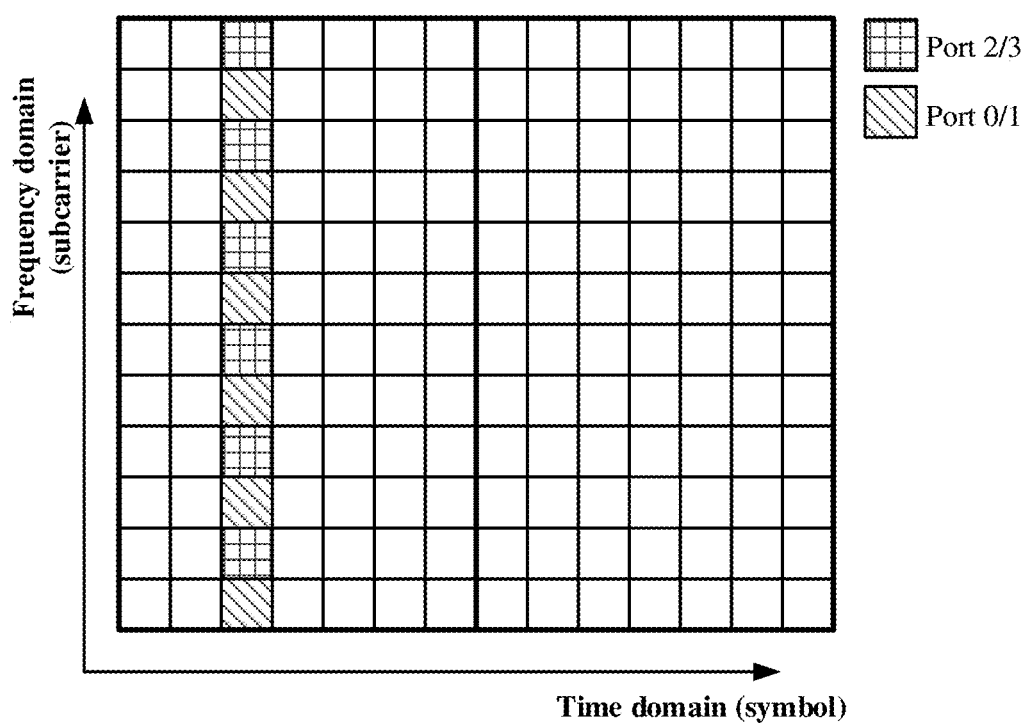
FIG. 5 shows a possible pilot pattern for four ports.

FIG. 5 is a schematic flowchart of a reference signal sending and receiving method 300 according to another embodiment of this application. FIG. 5 shows this embodiment of this application from a perspective of device interaction.

Figure 4:
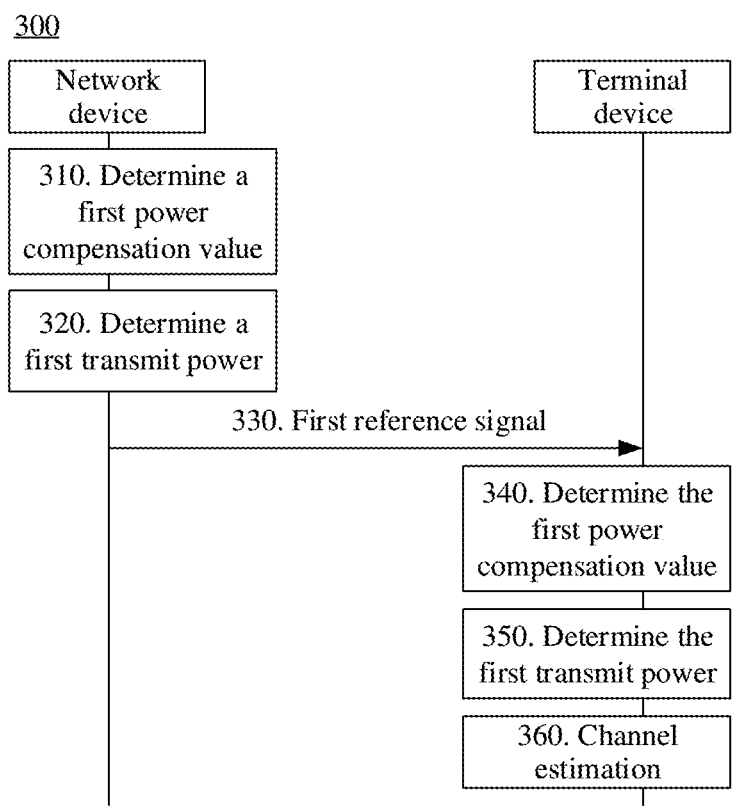
FIG. 4 is a schematic flowchart of a reference signal sending and receiving method according to another embodiment of this application.

As shown in FIG. 4, the method 300 includes step 310 to step 360.

In step 310, a network device determines a power boosting value (denoted as a first power boosting value for ease of distinguishing and description) of a first reference signal in at least three pre-stored power boosting values.

In step 320, the network device determines a transmit power (denoted as a first transmit power for ease of distinguishing and description) of the first reference signal based on the first power boosting value.

In step 330, the network device transmits the first reference signal based on the first transmit power.

Correspondingly, in step 330, a terminal device receives the first reference signal.

In step 340, the terminal device determines the first power boosting value.

In step 350, the terminal device determines the first transmit power based on the first power boosting value.

In step 360, the terminal device performs channel estimation based on the first transmit power.

Optionally, before step 310, the network device may first determine a quantity of ports that possibly need to be used for current data transmission, and then allocate a transmit power to each scheduled port, to be specific, allocate the transmit power to a time-frequency resource (including an RE used to carry a reference signal and an RE used to carry data) used to carry a signal. In a possible implementation, in a precoding process, the network device may allocate a power to each port by multiplying a reference signal by a column vector (it may be understood that each row in the column vector corresponds to one port), and a proportion relationship between rows in the column vector indicates a ratio between powers allocated to the ports. After RE mapping is performed on a precoded signal (including a reference signal and data), the signal has an initial transmit power on an RE corresponding to each port.

Generally, the network device may evenly allocate a power to each port. For example, when there are two ports, a power ratio is 1:1. However, this application does not exclude a possibility that the power allocated by the network device to each port is uneven. For example, when there are two ports, a power ratio is 2:1. Here, the case of even power allocation is first described. The case of uneven power allocation is described below in detail with reference to a specific example.

After determining a quantity of currently scheduled ports and the ratio between powers allocated to the ports, the network device may determine an initial transmit power of each port. Then, in step 210, the network device may further determine the first power boosting value based on the quantity of currently scheduled ports.

In this embodiment of this application, the network device may pre-store at least three optional power boosting values, where the power boosting value (namely, the first power boosting value) of the first reference signal may be determined from the at least three pre-stored power boosting values. Without loss of generality, the first power boosting value may be understood as a transmit power of at least one second port. Herein, the transmit power of the second port may be a transmit power of an RE that does not carry a signal on the second port, the RE may be an RE (namely, the first RE) corresponding to the first reference signal, or may be an RE that corresponds to another reference signal and that is not used to carry a signal on the second port. In other words, an RE used to compensate for the transmit power of the first reference signal may be an RE in a same scheduling period as the first RE (in other words, an RE on a same symbol or an RE that is on a different symbol and in a same scheduling period), or may be an RE in a same symbol as the RE. There may be one or more REs that carry the reference signal, and a specific quantity may be determined based on a quantity of REs occupied by the reference signal. In addition, it may be understood that the first RE corresponds to a reference signal on a specific port, and the first RE corresponding to a reference signal on a different port occupies a different time-frequency resource.

In this embodiment of this application, the network device may specifically determine the first power boosting value by using either of the following methods.

Method 1: The network device determines the first power boosting value based on a currently used first pilot pattern.

Method 2: The network device determines the first power boosting value based on the quantity of currently scheduled ports.

Because the network device determines the first power boosting value by using different methods, the terminal device also determines the first power boosting value by using different methods.

The following describes in detail specific implementation processes of the two methods from a perspective of a network device and a perspective of a terminal device.

In Method 1, correspondences between a plurality of pilot patterns and a plurality of power boosting values may be predetermined, for example, may be defined in a protocol and preconfigured in the network device. When determining a first pilot pattern that is used, the network device may determine a corresponding power boosting value as the first power boosting value.

Table 1 shows the correspondences between a plurality of pilot patterns and a plurality of power boosting values.

TABLE 1

| Index of a pilot pattern | Power boosting value |
|---|---|
| 0 | 0 dB |
| 1 | 3 dB |
| 2 | 6 dB |
| 3 | 4.7 dB |

The plurality of pilot patterns may be related to a quantity of ports. Specifically, a pilot pattern (referring to FIG. 5) whose index is 1 indicates time-frequency resources of reference signals on four ports; a pilot pattern (referring to FIG. 6) whose index is 2 indicates time-frequency resources of reference signals on eight ports; and a pilot pattern (referring to FIG. 5) whose index is 3 indicates time-frequency resources of reference signals on 12 ports. The first pilot pattern currently used by the network device may be determined based on the quantity of currently scheduled ports. For example, when the quantity of ports ranges from 1 to 4, the pilot pattern whose index is 1 is used. When the quantity of ports ranges from 5 to 8, the pilot pattern whose index is 2 is used. When the quantity of ports ranges from 9 to 12, the pilot pattern whose index is 3 is used. The first pilot pattern currently used by the network device may alternatively be determined based on another factor, for example, a carrier frequency.

It should be understood that a specific process in which the network device determines the currently used first pilot pattern may be the same as that in the prior art. For brevity, details are not described herein again.

The following describes the pilot pattern and the corresponding power boosting value in detail with reference to the accompanying drawings.

It should be noted that, for ease of description, the following example is described by using only a case in which a power of an RE the same as an RE occupied by a reference signal (for example, the first reference signal) is borrowed, but this application should not be limited thereto. A reference signal RE (it has been described above that the reference signal RE does not necessarily carry a reference signal on each port, but the reference signal RE is only used to carry a reference signal, and is not used to carry a data signal or another signal) that is in a same scheduling period and that is not used to carry a reference signal may be used to compensate for a reference signal on a current port (for example, a first port).

FIG. 5 shows a possible pilot pattern for four ports. As shown in FIG. 5, a same RE (denoted as an RE #1 for ease of distinguishing and description, where it may be understood that the RE #1 is a first RE of a port #0 and a port #1) is multiplexed for reference signals on the port #0 and the port #1 in a code division manner, and it may be considered that the port #0 and the port #1 form a CDM group (corresponding to the RE #1). A same RE (denoted as an RE #2 for ease of distinguishing and description, where it may be understood that the RE #2 is a first RE of a port #2 and a port #3, and the RE #1 and the RE #2 are only used to distinguish resources that carry reference signals on different ports) is multiplexed for the port #2 and the port #3 multiplex in a code division manner, and it may be considered that the port #2 and the port #3 form another CDM group (corresponding to the RE #2). In addition, a same time domain resource (corresponding to a same symbol in the figure) is multiplexed for the two CDM groups in a frequency division manner. A quantity of REs occupied by an orthogonal cover code used to distinguish different ports is 2. In this embodiment of this application, the quantity of REs occupied by the orthogonal cover code is denoted as a CDM length (CDM size), or is referred to as a length of the orthogonal cover code, and therefore a CDM length in the pilot pattern whose index is 1 is 2.

When the network device sends one or more reference signals by using any one or more ports in the port #0 to the port #3, neither the RE #1 nor the RE #2 is used to carry data or another reference signal on the four ports. Therefore, the RE #2 on the port #0 and the port #1 and the RE #1 on the port #2 and the port #3 are all in an idle state, a power of the RE #2 on the port #0 and the port #1 may be lent to the RE #2 on the port #2 and/or the port #3 to transmit reference signals on the port #2 and/or the port #3, and a power of the RE #1 on the port #2 and the port #3 may be lent to the RE #1 on the port #0 and/or the port #1 to transmit reference signals on the port #0 and/or the port #1. In other words, the two CDM groups can borrow a power of an RE in an idle state from each other. If it is assumed that the four ports are all used to transmit reference signals at present, each port can borrow a power the same as an initial transmit power. To be specific, a power boosting value is $10*\log_{10}(1+1)$, namely, 3 dB.

Figure 6:
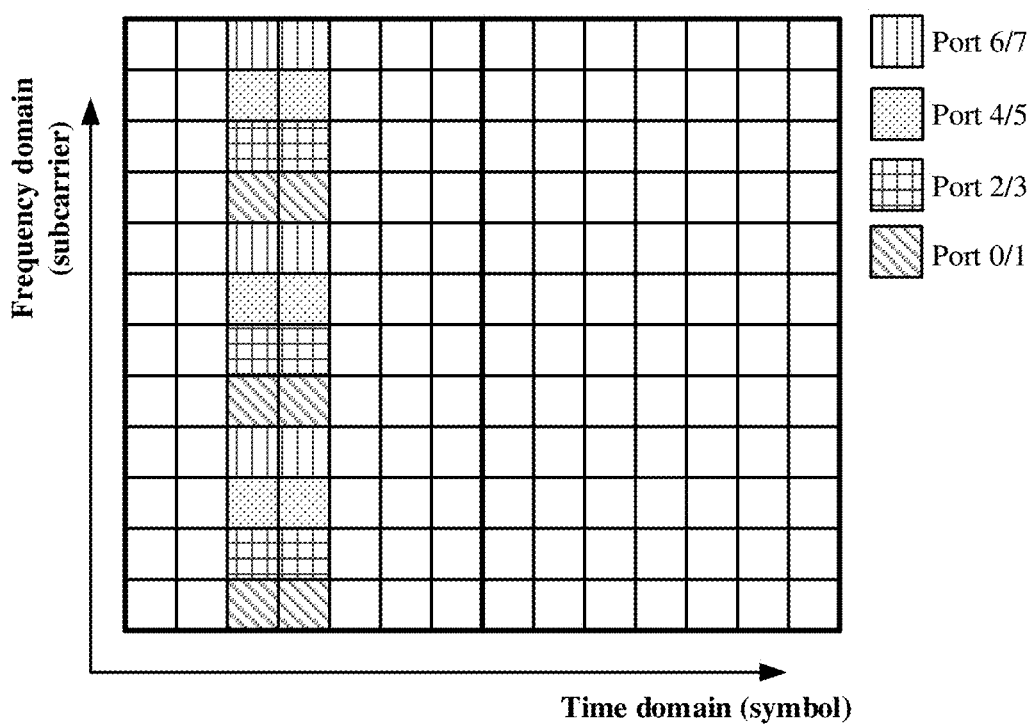
FIG. 6 shows a possible pilot pattern for eight ports.

FIG. 6 shows a possible pilot pattern for eight ports. As shown in FIG. 6, a same RE is multiplexed for reference signals on a port #0 and a port #1 in a code division manner, and it may be considered that the port #0 and the port #1 form a CDM group. A same RE is multiplexed for a port #2 and a port #3 in a code division manner, and it may be considered that the port #2 and the port #3 form another CDM group. A same RE is multiplexed for a port #4 and a port #5 in a code division manner, and it may be considered that the port #4 and the port #5 form still another CDM group. A same RE is multiplexed for a port #6 and a port #7 in a code division manner, and it may be considered that the port #6 and the port #7 form yet another CDM group. A same time domain resource (corresponding to two adjacent symbols in the figure) is multiplexed for the four CDM groups in a frequency division manner. A quantity of REs occupied by an orthogonal cover code used to distinguish different ports is 2, in other words, a CDM length is 2.

When the network device sends one or more reference signals by using any one or more ports in the port #0 to the port #7, REs occupied by the reference signals on the eight ports are not used to carry data or another signal on the eight ports. Therefore, powers on the port #2 to the port #7 may be lent to the port #0 and/or the port #1, to transmit a reference signal on the port #0 and/or the port #1. The rest may be deduced by analogy. For brevity, power borrowing cases of other ports are not described herein again. In other words, any CDM group can borrow a power from the other three CDM groups. If it is assumed the eight ports are all used to transmit reference signals at present, each port can borrow a power three times of an initial transmit power. To be specific, a power boosting value is $10*\log_{10}(3+1)$, namely, 6 dB.

Figure 7:
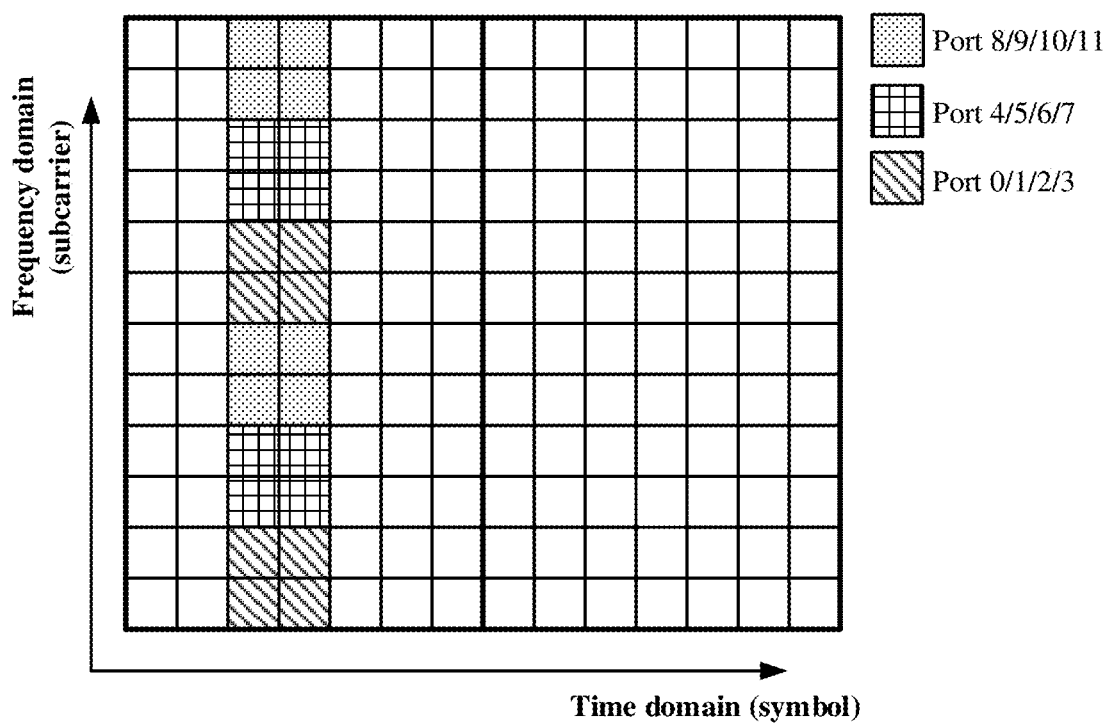
FIG. 7 shows a possible pilot pattern for 12 ports.

FIG. 7 shows a possible pilot pattern for 12 ports. As shown in FIG. 7, a same RE is multiplexed for a port #0, a port #1, a port #2, and a port #3 in a code division manner, and it may be considered that the port #0, the port #1, the port #2, and the port #3 form a CDM group. A same RE is multiplexed for a port #4, a port #5, a port #6, and a port #7 in a code division manner, and it may be considered that the port #4, the port #5, the port #6, and the port #7 form another CDM group. A same RE is multiplexed for port #8, a port #9, a port #10, and a port #11 in a code division manner, and it may be considered that the port #8, the port #9, the port #10, and the port #11 form still another CDM group. A same time domain resource (corresponding to two adjacent symbols in the figure) is multiplexed for the three CDM groups in a frequency division manner. A quantity of REs occupied by an orthogonal cover code used to distinguish different ports is 4, in other words, a CDM length is 4.

When the network device sends one or more reference signals by using any one or more ports in the port #0 to the port #11, REs occupied by the reference signals on the 12 ports are not used to carry data or another signal on the 12 ports. Therefore, powers on the port #4 to the port #11 may be lent to the port #0 and/or the port #1, to transmit a reference signal on the port #0 and/or the port #1. The rest may be deduced by analogy. For brevity, power borrowing cases of other ports are not described herein again. In other words, any CDM group can borrow a power from the other two CDM groups. If it is assumed that the 12 ports are all used to transmit reference signals at present, each port can borrow a power twice an initial transmit power. To be specific, a power boosting value is $10*\log_{10}(2+1)$, namely, 4.7 dB.

It should be understood that the pilot patterns described above with reference to the accompanying drawings are only examples, and should not constitute any limitation on this application. In the prior art, more possible pilot patterns are proposed, and this application does not exclude a possibility that more different pilot patterns are to be defined in future protocols. The method for binding a pilot pattern and a power boosting value provided in this application is also applicable to another pilot pattern.

In a possible implementation, the power boosting value corresponding to the pilot pattern may be calculated by using the following formula:

a power boosting value=$10*\log_{10}$(a total quantity of ports/a CDM length).

For example, the specific cases of four ports, eight ports, and 12 ports listed above are substituted into the foregoing formula. When the total quantity of ports is 4 and the CDM length is 2, the obtained power boosting value is $10*\log_{10}2=3$ (dB). When the total quantity of ports is 8 and the CDM length is 2, the obtained power boosting value is $10*\log_{10}4=6$ (dB). When the total quantity of ports is 12 and the CDM length is 4, the obtained power boosting value is $10*\log_{10}3=4.7$ (dB).

After determining the first power boosting value based on the currently used first pilot pattern in step 210, the network device may further determine the first transmit power based on the first power boosting value in step 220, and send the first reference signal based on the first transmit power in step 230.

It should be understood that, for ease of description, Table 1 lists possible correspondences between three pilot patterns and three power boosting values. However, this should not constitute any limitation on this application. A quantity of pilot patterns and a quantity of corresponding power boosting values are not limited to Table 1. In a possible case, different pilot patterns may be configured for a same quantity of ports, and CDM lengths in different pilot patterns may be different. For example, when the quantity of ports is 12, the CDM length may alternatively be 2, and the corresponding power boosting value may be 7.8 dB. In addition, alternatively, a plurality of pilot patterns may correspond to a same power boosting value. This is not specifically limited in this application.

It should be further understood that a specific process in which the network device sends a reference signal based on a transmit power may be the same as that in the prior art. For brevity, descriptions about a specific process in which the network device sends the first reference signal based on the first transmit power are omitted.

Correspondingly, after receiving the first reference signal in step 230, the terminal device may determine the first power boosting value in step 240.

In this embodiment of this application, the terminal device only needs to know the currently used first pilot pattern, and then can determine the first power boosting value.

In a possible design, the network device may indicate, to the terminal device by using higher layer signaling (for example, an RRC message), the currently used pilot pattern (namely, the first pilot pattern), and the network device uses the first pilot pattern to configure a resource for a reference signal within a period before a next RRC message is sent. In other words, in this period, the first power boosting value is always a power boosting value corresponding to the first pilot pattern. Therefore, a specific process in which the terminal device determines the first power boosting value in step 240 may include: When receiving the higher layer signaling indicating the pilot pattern, the terminal device determines the corresponding power boosting value as the first power boosting value.

In another possible design, the network device may pre-notify, by using higher layer signaling (for example, an RRC message), the terminal device of correspondences between a plurality of pilot patterns and a plurality of power boosting values. Subsequently, the network device may notify the terminal device of the currently used pilot pattern by using DCI, so that the terminal device determines the first power boosting value in step 240. Because a scheduling period of the DCI is relatively short, such a design has high flexibility, and the network device can adjust the quantity of ports in real time.

In addition, generally, the network device evenly allocates an initial transmit power to each port, and the terminal device also considers by default that the initial transmit power of each port is evenly allocated. Therefore, after determining the first power boosting value, the terminal device may determine the first transmit power in step 250, and further perform channel estimation based on the first transmit power in step 260.

It should be understood that a specific process in which the terminal device performs channel estimation based on a transmit power may be the same as that in the prior art. For brevity, descriptions about a specific process in which the terminal device performs channel estimation based on the first transmit power are omitted.

In conclusion, in Method 1, the first power boosting value may be determined based on a binding relationship between the pilot pattern and the power boosting value, and no additional signaling is needed to indicate the first power boosting value. Therefore, power utilization is improved, and accuracy of channel estimation is improved, so that data transmission reliability is improved, and signaling overheads are reduced.

However, in Method 1, it is assumed that all ports are used. Therefore, a power borrowed from an idle port is evenly allocated to active ports. For example, in the pilot pattern whose index is 1, powers of the port #2 and the port #3 are respectively lent to the port #0 and the port #1. However, if only one port in the port #0 and the port #1 is currently used, when the powers are borrowed from the port #2 and the port #3, not only the transmit power needs to be increased, but also a power on a symbol needs to be less than or equal to a threshold that is agreed on in advance. If a total transmit power on a symbol is greater than 1, peaks of some signals may exceed a peak value. In this case, peak clipping needs to be performed, to discard some signals. In this way, accuracy of channel estimation is reduced, and data decoding performance decreases.

In Method 2, the network device determines the first power boosting value based on the quantity of currently scheduled ports.

Specifically, the network device may determine an ideal power boosting value based on the quantity of currently scheduled ports, and determine the first power boosting value based on the ideal power boosting value and the at least three pre-stored power boosting values.

A specific method for determining the ideal power boosting value based on the quantity of currently scheduled ports by the network device is related to a resource multiplexing manner of a reference signals on a port.

If a resource is multiplexed for reference signals on a plurality of ports in a code division manner, for example, a same RE is multiplexed for a reference signal on a first port and a reference signal on at least one third port in a code division manner, an ideal power compensation value may be calculated by using the following formula:

a power boosting value=$10*\log_{10}$(a total quantity of ports/a CDM length).

This case may be usually applied to a scenario in which a quantity of ports is relatively large. For example, the quantity of ports is 8, 12, or even larger.

If a resource is multiplexed for reference signals on a plurality of ports only in a frequency division manner, for example, a same time domain resource is multiplexed for a reference signal on a first port and a reference signal on each of at least one fourth port in a frequency division manner, an ideal power compensation value may be calculated by using the following formula:

a power boosting value=$10*\log_{10}$(a total quantity of ports).

This case may be usually applied to a scenario in which a quantity of ports is relatively small. For example, the quantity of ports is 2, 4, or even 6.

For ease of understanding this case, detailed descriptions are provided below with reference to the accompanying drawings.

Figure 8:
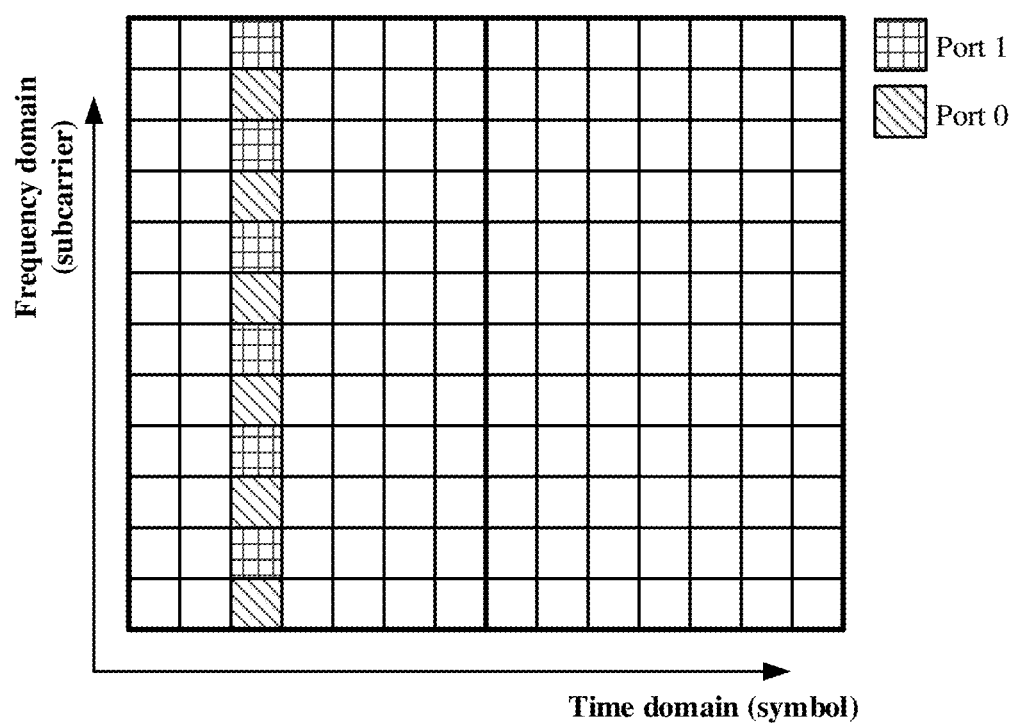
FIG. 8 shows a possible pilot pattern for two ports.

FIG. 8 shows a possible pilot pattern for two ports. As shown in FIG. 8, a same time domain resource is multiplexed for reference signals on a port #0 and a port #1 in a frequency division manner. In this case, the reference signals on the port #0 and the port #1 are distinguished by using different frequency domain resources. In this case, the reference signals on the two ports do not need to be distinguished by using an orthogonal cover code, and it may be considered that a length of the orthogonal cover code is 1. It is assumed that an RE occupied by the reference signal on the port #0 is an RE #1, an RE occupied by the reference signal on the port #1 is an RE #2, the RE #1 and the RE #2 are two REs on a same symbol, and the RE #1 and the RE #2 are not used to carry data or another signal on the port #0 and the port #1. Therefore, the RE #1 on the port #1 is in an idle state, and the RE #2 on the port #0 is in an idle state.

When the network device sends the reference signal by using the port #0, a power of the RE #1 on the port #1 may be lent to the RE #1 on the port #0, to transmit the reference signal on the port #0. When the network device sends the reference signal by using the port #1, a power of the RE #2 on the port #0 may be lent to the RE #2 on the port #1, to transmit the reference signal on the port #1. In other words, the two ports can borrow a power of an RE in an idle state from each other.

In addition, the power that can be borrowed may be calculated by using the following formula: a power boosting value=$10*\log_{10}$(a total quantity of ports), namely, $10*\log_{10}2=3$ (dB). Certainly, as the total quantity of ports increases, the power boosting value also increases. For example, if the total quantity of ports is 4, the power boosting value=$10*\log_{10}4=6$ (dB). In conclusion, in Method 2, the total quantity of ports in the formula may be the quantity of ports currently scheduled by the network device, and is not limited to a maximum quantity of ports in the pilot pattern. The power boosting value obtained through calculation by using the formula may be referred to as an ideal power boosting value. For example, if the quantity of currently scheduled ports is 10, the pilot pattern whose index is 3 in Method 1 may be used, and a CDM length is 4, but an ideal power boosting value obtained through calculation by using the foregoing formula is 4 dB.

The network device may pre-store a plurality of optional power boosting values, and after the ideal power boosting value is obtained through calculation based on the foregoing formula, the network device selects, from the plurality of optional power boosting values, a value close to the ideal power boosting value as the first power boosting value.

Table 2 shows a plurality of possible power boosting values.

TABLE 2

| Power boosting value | 0 | 3 | 4.7 | 6 | 7 | 7.8 | 8.5 | 9 |
| --- | --- | --- | --- | --- | --- | --- | --- | --- |

It should be understood that, for ease of description, Table 2 only lists eight possible power boosting values, but this does not constitute any limitation on this application. The power boosting value predefined by the network device is not limited to Table 2. In addition, a plurality of quantities of ports may correspond to a same power boosting value. This is not particularly limited in this application.

After determining the first power boosting value based on the quantity of currently scheduled ports and the length of the orthogonal cover code in step 210, the network device may further determine the first transmit power based on the first power boosting value in step 220, and send the first reference signal based on the first transmit power in step 230.

It should be understood that a specific process in which the network device sends a reference signal based on a transmit power may be the same as that in the prior art. For brevity, descriptions about a specific process in which the network device sends the first reference signal based on the first transmit power are omitted.

Correspondingly, after receiving the first reference signal in step 230, the terminal device may determine the first power boosting value in step 240.

In this embodiment of this application, the network device may indicate the first power boosting value to the terminal device by sending indication information to the terminal device.

Optionally, the method further includes: The network device sends indication information of the first power boosting value to the terminal device.

Optionally, the indication information of the first power boosting value may be carried in any one of the following: RRC, a MAC CE, or DCI.

In a possible implementation, the indication information of the first power boosting value may be an index of the first power boosting value.

Specifically, the network device may predefine a plurality of power boosting values, and the plurality of power boosting values correspond to optimal power boosting values of configurable pilot patterns. The network device may send the plurality of power boosting values and indexes of the plurality of power boosting values to the terminal device in advance, so that the terminal device stores the plurality of power boosting values and the indexes of the plurality of power boosting values in advance. After determining the first power boosting value for the first port, the network device may send the index of the first power boosting value to the terminal device, so that the terminal device determines the first power boosting value.

Table 3 shows correspondences between a plurality of possible power boosting values and indexes.

TABLE 3

| Index of a power boosting value | 0 | 1 | 2 | 3 | 4 | 5 | 6 | 7 |
|---|---|---|---|---|---|---|---|---|
| Power boosting value | 0 | 3 | 4.7 | 6 | 7 | 7.8 | 8.5 | 9 |

It should be understood that the correspondences between the power boosting values and the indexes shown in Table 3 are only examples for description, and should not constitute any limitation on this application.

It should be further understood that the method in which the network device sends the index of the first power boosting value to notify the terminal device of the first power boosting value is also only an example and should not constitute any limitation on this application.

Subsequently, the terminal device determines the first transmit power based on the first power boosting value in step 250, and further, perform channel estimation based on the first transmit power in step 260.

It should be understood that a specific process in which the terminal device performs channel estimation based on a transmit power may be the same as that in the prior art. For brevity, descriptions about a specific process in which the terminal device performs channel estimation based on the first transmit power are omitted.

In conclusion, in Method 2, the first power boosting value may be indicated by using signaling, and a more accurate power boosting value may be determined based on an actual quantity of currently scheduled ports. Compared with Method 1, signaling overheads are brought, but power utilization is further improved, and accuracy of channel estimation is improved. In this way, data transmission reliability is improved.

In the embodiments described above, it is assumed that the transmit power configured by the network device for each port is even. In some cases, power allocation between the ports is not even, but the method provided in this application may still be used to determine the first power boosting value.

First, the network device may determine an initial transmit power of each port based on a power allocation ratio. It may be understood from the foregoing descriptions that a power boosting value is related to a preconfigured initial transmit power, and different initial transmit powers indicate different power boosting values. Therefore, the network device may determine the first power boosting value and the first transmit power based on the initial transmit power determined based on the power allocation ratio.

For example, if the quantity of currently scheduled ports is 2, for example, the first port and the second port are included, a ratio of an initial transmit power of the first port to an initial transmit power of the second port is 2:1, and a resource is not multiplexed for reference signals on the first port and the second port in a CDM manner, the first port may borrow a power from the second port to transmit the first reference signal. However, because the ratio of the initial transmit power of the first port to the initial transmit power of the second port is 2:1, the first port may borrow, from the second port, a power that is half of the initial transmit power. To be specific, the power boosting value is $10*\log_{10}1.5$, namely, 1.76 dB. However, the second port may borrow a power from the first port to transmit a reference signal (for example, denoted as a second reference signal). The second port borrows, from the first port, a power twice the initial transmit power, to be specific, the power boosting value is $10*\log_{10}3$, namely, 4.76 dB.

The network device may notify the terminal device of the first power boosting value by using indication information (for example, the indication information of the first power boosting value), or may notify the terminal device of the power allocation ratio, and the terminal device determines the first power boosting value.

If the first power boosting value belongs to a plurality of optional power boosting values pre-stored by the network device, for example, a calculated first power compensation value is the same as or close to one of the plurality of pre-stored optional power boosting values, the network device may directly send an index of the first power boosting value to the terminal device. If the first power boosting value does not belong to a plurality of optional power boosting values pre-stored by the network device, for example, a calculated first power compensation value is different from or not close to any one of the plurality of pre-stored optional power boosting values, the network device may directly send, to the terminal device, the first power boosting value or information used to determine the first power boosting value, for example, a quantized value of the first power boosting value. Alternatively, the network device may send, to the terminal device, the power allocation ratio or information used to determine the power allocation ratio, for example, a quantized value of the power allocation ratio, and the terminal device may obtain the first power boosting value through calculation based on the power allocation ratio.

The power allocation ratio may be used to determine the initial transmit power of the first reference signal. It may be understood from the foregoing descriptions that a power boosting value is related to a preconfigured initial transmit power, and different initial transmit powers indicate different power boosting values. Therefore, the terminal device may determine the first power boosting value and the first transmit power based on the initial transmit power determined based on the power allocation ratio.

Optionally, the method further includes the following operation:

The network device sends indication information of a second power boosting value to the terminal device.

Specifically, in addition to borrowing a power from an idle port to send the first reference signal, the network device may also borrow a power from an RE (denoted as data RE below for ease of description) that carries data. For example, when the network device uses a plurality of antennas to send data, data transmission reliability may be improved by using a multi-antenna gain. In this case, a transmit power of a second RE only needs to ensure that data can be correctly decoded. In this embodiment of this application, a transmit power borrowed from the second RE is denoted as the second power boosting value.

It should be noted that the data RE may be an RE on the first port or may be an RE on another port. A power of the data RE may be lent to the first port for sending the first reference signal, provided that the data RE is on a same symbol as the RE used to carry the first reference signal.

Therefore, in this embodiment of this application, a plurality of power boosting values are pre-configured, an appropriate power boosting value is determined for a different quantity of ports based on a quantity of currently scheduled ports, and a reference signal is sent based on the power boosting value and an initial transmit power, to utilize power to a greater extent, thereby improving power utilization. In addition, accuracy of channel estimation is improved by increasing a transmit power, thereby improving data transmission reliability.

It should be understood that in this embodiment of this application, the first RE and the second RE are used to distinguish carried signals, the first RE is used to carry a reference signal, and the second RE is used to carry data. For different ports, time-frequency resources corresponding to the first RE and the second RE may be different.

It should be further understood that the first, second, third, and fourth are only used to distinguish different objects, for example, different ports and different reference signals, and should not constitute any limitation on this application.

The foregoing describes in detail the reference signal sending and receiving method in the embodiments of this application with reference to FIG. 3 to FIG. 7. The following describes in detail a network device and a terminal device in the embodiments of this application with reference to FIG. 9 to FIG. 12.

Figure 9:
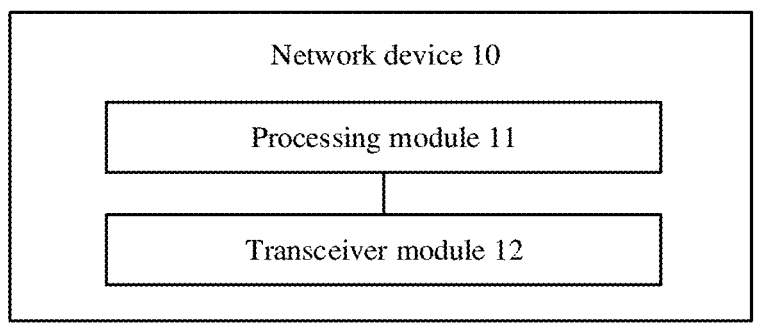
FIG. 9 is a schematic block diagram of a network device according to an embodiment of this application.

FIG. 9 is a schematic block diagram of a network device 10 according to an embodiment of this application. As shown in FIG. 9, the network device 10 includes a processing module 11 and a transceiver module 12.

It should be understood that the network device 10 may correspond to a network device in the reference signal sending and receiving method 200 according to the embodiments of this application. The network device 10 may include modules configured to perform a method performed by the network device in the reference signal sending and receiving method 200 in FIG. 3. In addition, each module in the network device 10 and the foregoing other operations and/or functions are respectively used to implement a corresponding procedure of the reference signal sending and receiving method 200 in FIG. 3. Specifically, the processing module 11 is configured to perform step 210 in the method 200, the transceiver module 12 is configured to perform step 220 in the method 200. A specific process in which the modules perform the foregoing corresponding steps is described in detail in the method 200. For brevity, details are not described herein again.

Alternatively, the network device 10 may correspond to a network device in the reference signal sending and receiving method 300 according to the embodiments of this application. The network device may include modules configured to perform a method performed by the network device in the reference signal sending and receiving method 300 in FIG. 4. In addition, each module in the network device 10 and the foregoing other operations and/or functions are respectively used to implement a corresponding procedure of the reference signal sending and receiving method 300 in FIG. 4. Specifically, the processing module 11 is configured to perform step 310 and step 320 in the method 300, the transceiver module 12 is configured to perform step 330 in the method 300. A specific process in which the modules perform the foregoing corresponding steps is described in detail in the method 200. For brevity, details are not described herein again.

Figure 10:
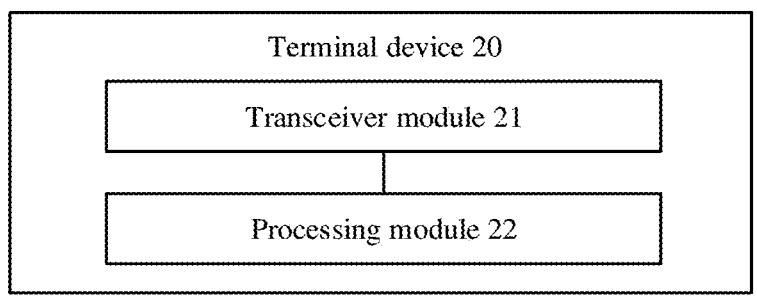
FIG. 10 is a schematic block diagram of a terminal device according to an embodiment of this application.

FIG. 10 is a schematic block diagram of a terminal device 20 according to an embodiment of this application. As shown in FIG. 10, the terminal device 20 includes a transceiver module 21 and a processing module 22.

It should be understood that the terminal device 20 may correspond to a terminal device in the reference signal sending and receiving method 200 according to the embodiments of this application. The terminal device 20 may include modules configured to perform a method performed by the terminal device in the reference signal sending and receiving method 200 in FIG. 3. In addition, each module in the terminal device 20 and the foregoing other operations and/or functions are respectively used to implement a corresponding procedure of the reference signal sending and receiving method 200 in FIG. 3. Specifically, the transceiver module 21 is configured to perform step 220 in the method 200, the processing module 22 is configured to perform step 230 and step 240 in the method 200. A specific process in which the modules perform the foregoing corresponding steps is described in detail in the method 200. For brevity, details are not described herein again.

Alternatively, the terminal device 20 may correspond to a terminal device in the reference signal sending and receiving method 300 according to the embodiments of this application. The terminal device 20 may include modules configured to perform a method performed by the terminal device in the reference signal sending and receiving method 300 in FIG. 4. In addition, each module in the terminal device 20 and the foregoing other operations and/or functions are respectively used to implement a corresponding procedure of the reference signal sending and receiving method 300 in FIG. 4. Specifically, the transceiver module 21 is configured to perform step 330 in the method 200, the processing module 22 is configured to perform step 340 to step 360 in the method 200. A specific process in which the modules perform the foregoing corresponding steps is described in detail in the method 300. For brevity, details are not described herein again.

Figure 11:
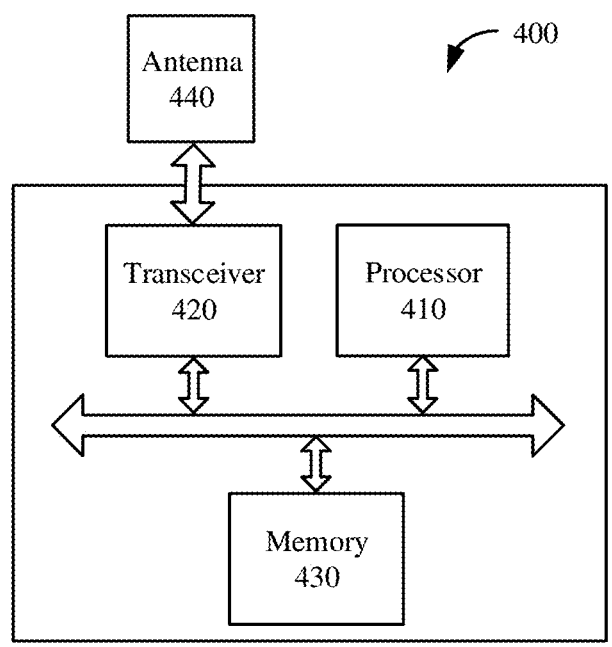
FIG. 11 is another schematic block diagram of a network device according to an embodiment of this application.

FIG. 11 is another schematic block diagram of a network device 400 according to an embodiment of this application. As shown in FIG. 11, the network device 400 includes a processor 410 and a transceiver 420. Optionally, the network device 400 further includes a memory 430. The processor 410, the transceiver 420, and the memory 430 communicate with each other by using an internal connection path, and transfer control and/or data signals. The memory 430 is configured to store a computer program, and the processor 410 is configured to invoke the computer program from the memory 430 and run the computer program, to control the transceiver 420 to receive/send a signal.

The processor 410 and the memory 430 may be combined into one processing apparatus, and the processor 410 is configured to execute program code stored in the memory 430 to implement the foregoing functions. In a specific implementation, the memory 430 may alternatively be integrated into the processor 410, or independent of the processor 410.

The network device may further include an antenna 440, configured to send, by using a radio signal, downlink data or downlink control signaling output by the transceiver 420.

Specifically, the network device 400 may correspond to a network device in the reference signal sending and receiving method 200 according to the embodiments of this application. The network device 400 may include modules configured to perform a method performed by the network device in the reference signal sending and receiving method 200 in FIG. 3. In addition, each module in the network device 400 and the foregoing other operations and/or functions are respectively used to implement a corresponding procedure of the reference signal sending and receiving method 200 in FIG. 3. Specifically, the memory 430 is configured to store program code, and when executing the program code, the processor 410 performs step 210 in the method 200, and controls the transceiver 420 to perform step 220 in the method 200 by using the antenna 440. A specific process in which the modules perform the foregoing corresponding steps is described in detail in the method 200. For brevity, details are not described herein again.

Alternatively, the network device 400 may correspond to a network device in the reference signal sending and receiving method 300 according to the embodiments of this application. The network device 400 may include modules configured to perform a method performed by the network device in the reference signal sending and receiving method 300 in FIG. 4. In addition, each module in the network device 400 and the foregoing other operations and/or functions are respectively used to implement a corresponding procedure of the reference signal sending and receiving method 300 in FIG. 4. Specifically, the memory 430 is configured to store program code, and when executing the program code, the processor 410 performs step 310 and step 320 in the method 300, and controls the transceiver 420 to perform step 330 in the method 300 by using the antenna 440. A specific process in which the modules perform the foregoing corresponding steps is described in detail in the method 300. For brevity, details are not described herein again.

Figure 12:
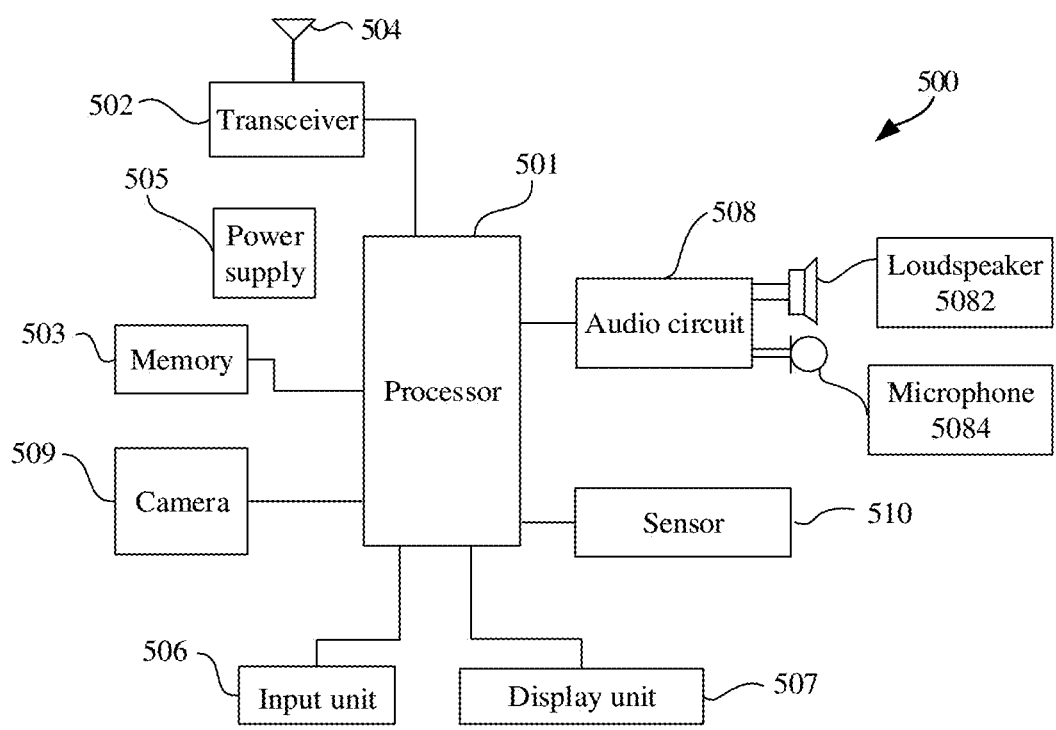
FIG. 12 is another schematic block diagram of a terminal device according to an embodiment of this application.

FIG. 12 is another schematic block diagram of a terminal device 500 according to an embodiment of this application. As shown in FIG. 12, the terminal device 500 includes a processor 501 and a transceiver 502. Optionally, the terminal device 500 further includes a memory 503. The processor 502, the transceiver 502, and the memory 503 communicate with each other by using an internal connection path, and transfer control and/or data signals. The memory 503 is configured to store a computer program, and the processor 501 is configured to invoke the computer program from the memory 503 and run the computer program, to control the transceiver 502 to receive/send a signal.

The processor 501 and the memory 503 may be combined into one processing apparatus, and the processor 501 is configured to execute program code stored in the memory 503 to implement the foregoing functions. In a specific implementation, the memory 503 may alternatively be integrated into the processor 501, or independent of the processor 501. The terminal device 500 may further include an antenna 504, configured to send, by using a radio signal, uplink data or uplink control signaling output by the transceiver 502.

Specifically, the terminal device 500 may correspond to a terminal device in the reference signal sending and receiving method 200 according to the embodiments of this application. The terminal device 500 may include modules configured to perform a method performed by the terminal device in the reference signal sending and receiving method 200 in FIG. 3. In addition, each module in the terminal device 500 and the foregoing other operations and/or functions are respectively used to implement a corresponding procedure of the reference signal sending and receiving method 200 in FIG. 3. Specifically, the memory 503 is configured to store program code, and when executing the program code, the processor 501 controls the transceiver 502 to perform step 220 in the method 200 by using the antenna 504, and performs step 230 and step 240 in the method 200. A specific process in which the modules perform the foregoing corresponding steps is described in detail in the method 200. For brevity, details are not described herein again.

Alternatively, the terminal device 500 may correspond to a terminal device in the reference signal sending and receiving method 300 according to the embodiments of this application. The terminal device 500 may include modules configured to perform a method performed by the terminal device in the reference signal sending and receiving method 300 in FIG. 4. In addition, each module in the terminal device 500 and the foregoing other operations and/or functions are respectively used to implement a corresponding procedure of the reference signal sending and receiving method 300 in FIG. 4. Specifically, the memory 503 is configured to store program code, and when executing the program code, the processor 501 controls the transceiver 502 to perform step 330 in the method 300 by using the antenna 504, and performs step 340 to step 360 in the method 300. A specific process in which the modules perform the foregoing corresponding steps is described in detail in the method 300. For brevity, details are not described herein again.

The processor 501 may be configured to execute an action that is implemented inside the terminal and that is described in the foregoing method embodiments, and the transceiver 502 may be configured to execute an action, of transmitting or sending by the terminal to the network device, that is described in the foregoing method embodiments. For details, refer to the descriptions in the foregoing method embodiments. Details are not described herein again.

The processor 501 and the memory 503 may be combined into one processing apparatus, and the processor 501 is configured to execute program code stored in the memory 503 to implement the foregoing functions. In a specific implementation, the memory 503 may alternatively be integrated into the processor 501.

The terminal device 500 may further include a power supply 505, configured to supply power to various components or circuits in the terminal.

In addition, to improve the functions of the terminal device, the terminal device 500 may further include one or more of an input unit 506, a display unit 507, an audio circuit 508, a camera 509, and a sensor 510, and the audio circuit may further include a loudspeaker 5082, a microphone 5084, and the like.

It should be understood that, the processor in the embodiments of this application may be a central processing unit (CPU), or may further be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

All or some of the foregoing embodiments may be implemented by using software, hardware, firmware, or any combination thereof. When software is used to implement the embodiments, the foregoing embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a network device, a transmit power to be used to transmit a reference signal, wherein the transmit power is related to a quantity of ports carried on a resource element (RE) to be occupied by the reference signal, and the transmit power of the reference signal is determined using a currently used pilot pattern and correspondences between at least three pre-stored power boosting power boosting values and a plurality of pilot patterns; and
   sending, by the network device, the reference signal based on the transmit power.

2. The method according to claim 1, further comprising:
   sending, by the network device, first indication information, wherein the first indication information indicates a sum of respective transmit powers allocated to the ports currently carried on the RE.

3. A method, comprising:
   receiving, by a terminal device, a reference signal;
   determining, by the terminal device, a transmit power of the reference signal, wherein the transmit power is related to a quantity of ports carried on a resource element (RE) occupied by the reference signal, and the transmit power of the reference signal is determined using a currently used pilot pattern and correspondences between at least three pre-stored power boosting power boosting values and a plurality of pilot patterns; and performing, by the terminal device, channel estimation based on the reference signal and the transmit power.

4. A terminal device, comprising:
a receiver, configured to receive a reference signal;
a processor; and
a non-transitory computer-readable storage medium storing a program to be executed by the processor, the program including instructions for: and
   determining a transmit power of the reference signal, wherein the transmit power is related to a maximum quantity of ports that can be carried on a resource element (RE) occupied by the reference signal, and the transmit power of the reference signal is determined using a currently used pilot pattern and correspondences between at least three pre-stored power boosting power boosting values and a plurality of pilot patterns; and
   performing channel estimation based on the reference signal and the transmit power.

5. The terminal device according to claim 4, wherein the receiver is further configured to:
receive first indication information, wherein the first indication information indicates a sum of respective transmit powers allocated to the ports carried on the RE occupied by the reference signal.

6. The terminal device according to claim 5, wherein the first indication information is carried in a radio resource control (RRC) message.

7. The terminal device according to claim 4, wherein the program further includes instructions for:
receiving indication information indicating the currently used pilot pattern.

8. The terminal device according to claim 7, wherein the indication information is received using radio resource control (RRC) signaling.

9. The terminal device according to claim 4, wherein the channel estimation is performed to measure channel state information (CSI); and
wherein the program further includes instructions for:
sending measured CSI information to a network device.

10. The method according to claim 1, further comprising:
sending indication information indicating the currently used pilot pattern.

11. The method according to claim 10, wherein the indication information is sent using radio resource control (RRC) signaling.

12. The method according to claim 1, further comprising:
receiving channel state information (CSI) that is measured using the reference signal.

13. The method according to claim 3, further comprising:
receiving indication information indicating the currently used pilot pattern.

14. The method according to claim 13, wherein the indication information is received using radio resource control (RRC) signaling.

15. The method according to claim 3, wherein the channel estimation is performed to measure channel state information (CSI); and
wherein the method further comprises:
sending measured CSI information to a network device.

* * * * *